US012679618B2

(12) United States Patent
Brakob et al.

(10) Patent No.: US 12,679,618 B2
(45) Date of Patent: Jul. 14, 2026

(54) SECURE INSERTS FOR GIFT CARDS

(71) Applicant: Target Brands, Inc., Minneapolis, MN (US)

(72) Inventors: Christopher Brakob, Minneapolis, MN (US); Donnie Tolbert, Carver, MN (US); Surjeet Bhoora, Bangalore (IN); Matthew Levy, Chanhassen, MN (US)

(73) Assignee: Target Brands, Inc., Minneapolis, MN (US)

( * ) Notice: Subject to any disclaimer, the term of this patent is extended or adjusted under 35 U.S.C. 154(b) by 103 days.

(21) Appl. No.: 18/941,504

(22) Filed: Nov. 8, 2024

(65) Prior Publication Data

US 2025/0263215 A1 Aug. 21, 2025

Related U.S. Application Data

(60) Provisional application No. 63/556,137, filed on Feb. 21, 2024.

(51) Int. Cl.
B65D 73/00 (2006.01)
G06Q 20/34 (2012.01)

(52) U.S. Cl.
CPC ....... B65D 73/0078 (2013.01); G06Q 20/354 (2013.01); B65D 2203/06 (2013.01); G06Q 20/349 (2013.01)

(58) Field of Classification Search
CPC ............ B65D 73/0078; B65D 2203/06; G06Q 20/354; G06Q 20/349; G06Q 20/202; G06Q 20/342
See application file for complete search history.

(56) References Cited

U.S. PATENT DOCUMENTS 4,398,708 A 8/1983 Goldman et al.
5,286,061 A 2/1994 Behm
(Continued)

FOREIGN PATENT DOCUMENTS

CA 172324 7/2018
CA 187373 8/2020
(Continued)

OTHER PUBLICATIONS

"Take your package design beyond the expected", traveltags.com, accessed on Oct. 11, 2024 at https://www.traveltags.com/card-services/card-packaging, 3 pages.
(Continued)

*Primary Examiner* — Tuyen K Vo
(74) *Attorney, Agent, or Firm* — Barnes & Thornburg LLP

(57) ABSTRACT

Disclosed combinable gift card components for a gift card purchase. A gift card can include a card component having a front surface, a back surface, a window, and a first identifier, and a secure insert component having: a secure insert portion with a second identifier, teeth at a leading edge of the secure insert component to mate with corresponding teeth of a middle layer of the card component for fixed alignment of the secure insert component inside the card component, an adhesive-resistant covering that can fold over the secure insert portion to hide the second identifier before the secure insert component is inserted into the card component, and a tab affixed to an end of the adhesive-resistant covering that can be pulled to cause the adhesive-resistant covering to unfold out from inside the card component to reveal the second identifier through the window.

10 Claims, 23 Drawing Sheets

(56) References Cited

U.S. PATENT DOCUMENTS

| | | | |
|---|---|---|---|
| 5,500,514 A | 3/1996 | Veeneman et al. | |
| 5,791,474 A | 8/1998 | Hansen | |
| 5,803,504 A | 9/1998 | Deshiens et al. | |
| 6,142,533 A | 11/2000 | Borowski, Jr. | |
| D450,760 S | 11/2001 | Luciano et al. | |
| D493,829 S | 8/2004 | Foster | |
| 6,832,720 B2 | 12/2004 | Dawson | |
| D522,052 S | 5/2006 | Lubking | |
| D524,654 S | 7/2006 | Keiichi et al. | |
| 7,290,705 B1 | 11/2007 | Shin | |
| 7,354,004 B2 | 4/2008 | Andersen et al. | |
| 7,374,095 B2 | 5/2008 | Blank et al. | |
| 7,584,887 B1 * | 9/2009 | Sanchez | H04M 17/02 |
| | | | 235/448 |
| 7,753,262 B2 * | 7/2010 | Kingsborough | B42D 25/369 |
| | | | 235/383 |
| 8,251,185 B2 * | 8/2012 | Manabe | B66B 5/024 |
| | | | 187/313 |
| 8,251,285 B2 | 8/2012 | Kingsborough et al. | |
| 8,430,298 B2 | 4/2013 | Martinez et al. | |
| 8,523,078 B2 | 9/2013 | Biskupski | |
| 8,594,286 B2 | 11/2013 | New et al. | |
| 8,622,436 B2 | 1/2014 | Mehta et al. | |
| 8,727,213 B2 | 5/2014 | Wilen | |
| 8,925,823 B2 * | 1/2015 | Chakiris | B42D 15/045 |
| | | | 235/487 |
| 8,939,354 B1 | 1/2015 | Hinson et al. | |
| D734,388 S | 7/2015 | Lin et al. | |
| RE45,762 E | 10/2015 | Raksha et al. | |
| D785,334 S | 5/2017 | Holt et al. | |
| D813,302 S | 3/2018 | Getachew et al. | |
| D854,615 S | 7/2019 | Hamilton et al. | |
| D881,270 S | 4/2020 | Narayan et al. | |
| D940,569 S | 1/2022 | Pierron et al. | |
| 11,379,810 B2 | 7/2022 | Curtis | |
| D963,471 S | 9/2022 | Larson | |
| 2001/0022446 A1 | 9/2001 | Klure | |
| 2005/0038714 A1 | 2/2005 | Bonet et al. | |
| 2007/0096457 A1 | 5/2007 | Cahill | |
| 2007/0224398 A1 | 9/2007 | Raksha et al. | |
| 2007/0272743 A1 | 11/2007 | Christie et al. | |
| 2008/0217415 A1 | 9/2008 | Royer | |
| 2009/0038968 A1 | 2/2009 | Smith | |
| 2014/0116908 A1 * | 5/2014 | Beyer | B65B 51/04 |
| | | | 206/449 |
| 2018/0053157 A1 | 2/2018 | Roffey | |

FOREIGN PATENT DOCUMENTS

| | | |
|---|---|---|
| CN | 302370719 | 3/2013 |
| CN | 302924774 | 8/2014 |
| CN | 303070306 | 1/2015 |
| CN | 303070307 | 1/2015 |
| CN | 303090171 | 1/2015 |
| CN | 303480618 | 12/2015 |
| CN | 304105177 | 4/2017 |
| CN | 304209564 | 7/2017 |
| CN | 305698549 | 4/2020 |
| CN | 306019714 | 8/2020 |
| CN | 308044830 | 5/2023 |
| CN | 308777793 | 8/2024 |
| DE | 402023202640-0007 | 5/2024 |
| EM | 015055010-0001 | 4/2024 |
| EP | 1514695 | 3/2005 |
| GB | 4022615 | 1/2012 |
| GB | 4035911 | 7/2014 |
| GB | 9003064179-0002 | 4/2016 |
| GB | 9003064179-0003 | 4/2016 |
| GB | 9003064179-0004 | 4/2016 |
| GB | 9003064179-0005 | 4/2016 |
| GB | 9003081405-0001 | 4/2016 |
| GB | 9003081405-0002 | 4/2016 |
| GB | 9003081405-0003 | 4/2016 |
| GB | 9003081405-0004 | 4/2016 |
| GB | 6062822 | 6/2019 |
| GB | 6103479 | 10/2020 |
| GB | 6341541 | 1/2024 |
| JP | D1561094 | 10/2016 |
| JP | D1568183 | 1/2017 |

OTHER PUBLICATIONS

Anti-Counterfeiting Ink Printing Overview, Holo solution Inc., Dec. 24, 2020, accessed on Oct. 11, 2024 at https://www.holoteam.com/post/anti-counterfeiting-ink-en, 13 pages.

Diane Wilson, "How scammers can drain gift cards before you even buy them", abc11.com, accessed on Oct. 11, 2024 at https://abc11.com/gift-card-scams-buy/5742144/, 4 pages.

Eva Sgroi, "Beware of Apple Gift Card Scam", itnewsafrica.com, Jul. 14, 2023, accessed on Oct. 11, 2024 at https://www.itnewsafrica.com/2023/07/beware-of-apple-gift-card-scam/, 1 page.

Gidget Alikpala, "How do scammers rip off Walmart gift card holders? Fraud prevention techniques", en.as.com, accessed on Oct. 11, 2024 at https://en.as.com/latest_news/how-do-scammers-rip-off-walmart-gift-card-holders-fraud-prevention-techniques-n/, 8 pages.

Michael Schwartz, "Gift card balance drained before used, how hackers do it", wkbw.com, accessed on Oct. 11, 2024 at https://www.wkbw.com/7problemsolvers/gift-card-balance-drained-before-used-how-hackers-do-it, 7 pages.

"What is a Gift Card Scam?", giftcards.com, accessed on Oct. 14, 2024 at https://web.archive.org/web/20240620004819/https://www.giftcards.com/blog/giftcard-scams, 12 pages.

* cited by examiner

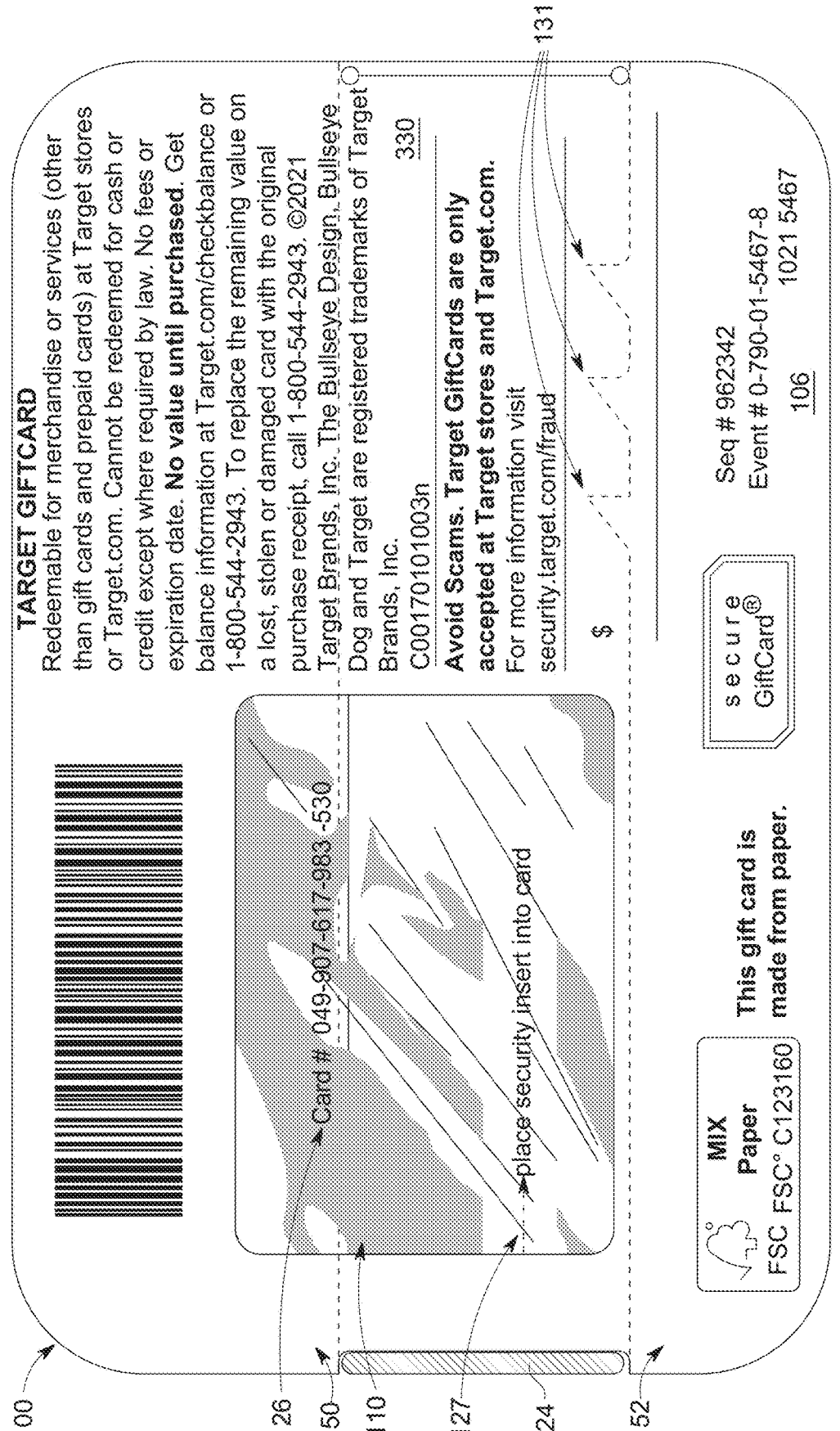

TARGET GIFTCARD

Redeemable for merchandise or services (other than gift cards and prepaid cards) at Target stores or Target.com. Cannot be redeemed for cash or credit except where required by law. No fees or expiration date. No value until purchased. Get balance information at Target.com/checkbalance or 1-800-544-2943. To replace the remaining value on a lost, stolen or damaged card with the original purchase receipt, call 1-800-544-2943. ©2021 Target Brands, Inc. The Bullseye Design, Bullseye Dog and Target are registered trademarks of Target Brands, Inc.

C0017010101003n     330

Avoid Scams. Target GiftCards are only accepted at Target stores and Target.com. For more information visit security.target.com/fraud $ place security insert into card Card # 049-907-617-983-530 secure GiftCard®

Seq # 962342
Event # 0-790-01-5467-8
1021 5467
106

MIX
Paper
FSC FSC° C123160

This gift card is made from paper.

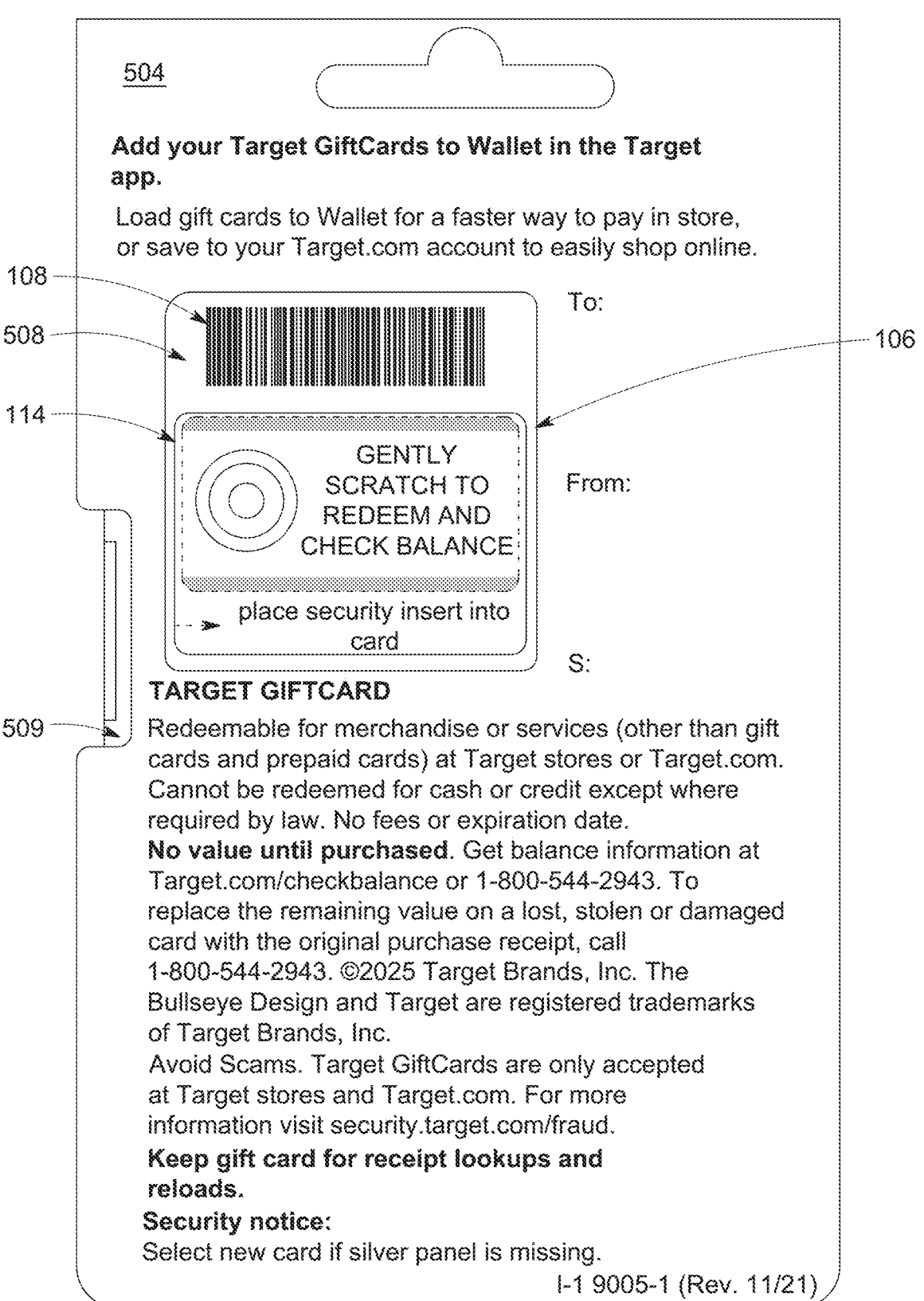

504

Add your Target GiftCards to Wallet in the Target app.

Load gift cards to Wallet for a faster way to pay in store, or save to your Target.com account to easily shop online.

108

508

114

106

To:

GENTLY
SCRATCH TO
REDEEM AND
CHECK BALANCE

From:

place security insert into card

S:

509

TARGET GIFTCARD

Redeemable for merchandise or services (other than gift cards and prepaid cards) at Target stores or Target.com. Cannot be redeemed for cash or credit except where required by law. No fees or expiration date.
No value until purchased. Get balance information at Target.com/checkbalance or 1-800-544-2943. To replace the remaining value on a lost, stolen or damaged card with the original purchase receipt, call 1-800-544-2943. ©2025 Target Brands, Inc. The Bullseye Design and Target are registered trademarks of Target Brands, Inc.
Avoid Scams. Target GiftCards are only accepted at Target stores and Target.com. For more information visit security.target.com/fraud.
Keep gift card for receipt lookups and reloads.
Security notice:
Select new card if silver panel is missing.

I-1 9005-1 (Rev. 11/21)

FIG. 5A (Cont'd)

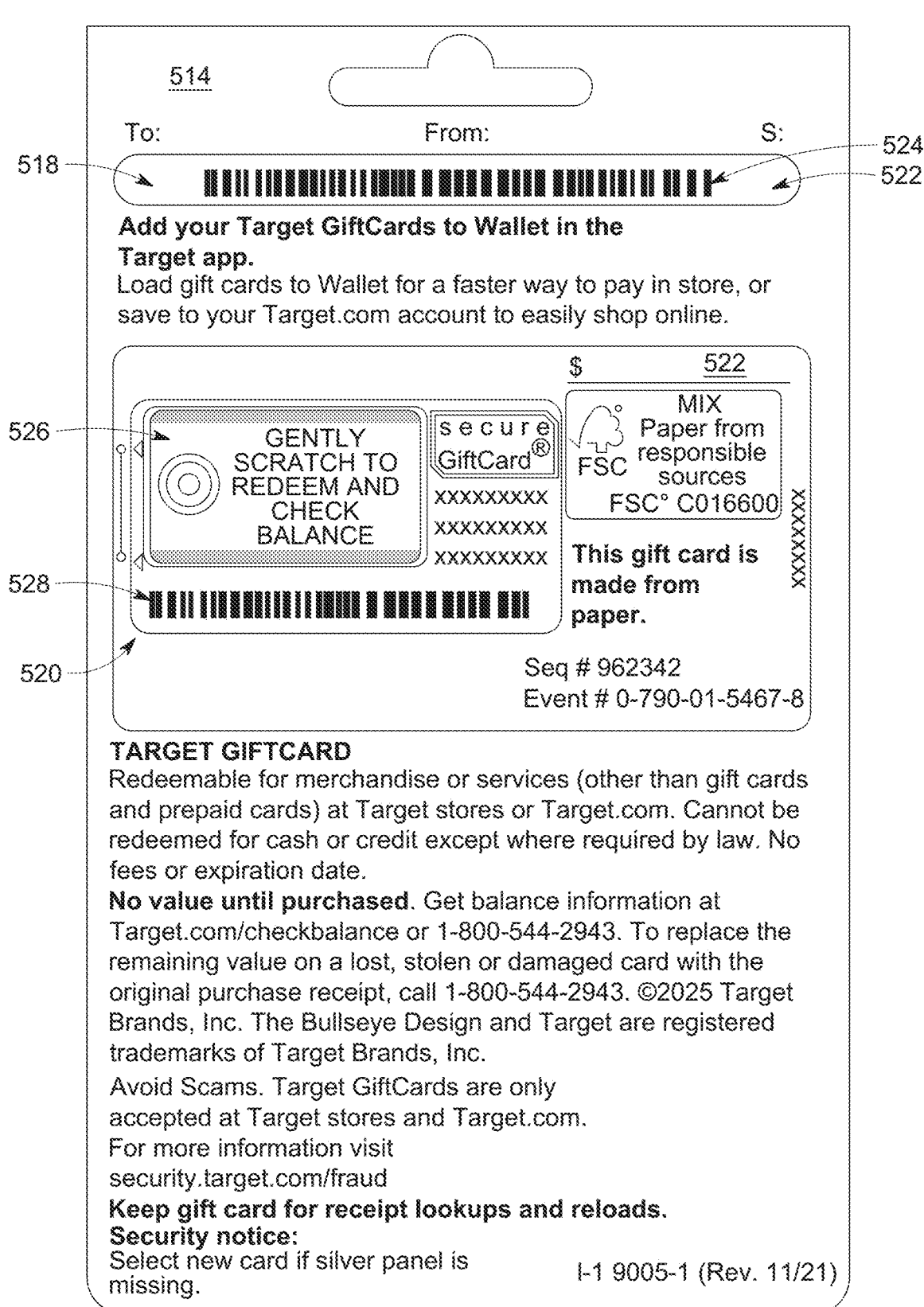

Add your Target GiftCards to Wallet in the Target app.
Load gift cards to Wallet for a faster way to pay in store, or save to your Target.com account to easily shop online.

GENTLY SCRATCH TO REDEEM AND CHECK BALANCE s e c u r e GiftCard®
xxxxxxxx
xxxxxxxx
xxxxxxxx $          522

MIX
Paper from responsible sources
FSC° C016600

FSC

This gift card is made from paper.

xxxxxxxx

Seq # 962342
Event # 0-790-01-5467-8

TARGET GIFTCARD
Redeemable for merchandise or services (other than gift cards and prepaid cards) at Target stores or Target.com. Cannot be redeemed for cash or credit except where required by law. No fees or expiration date.
No value until purchased. Get balance information at Target.com/checkbalance or 1-800-544-2943. To replace the remaining value on a lost, stolen or damaged card with the original purchase receipt, call 1-800-544-2943. ©2025 Target Brands, Inc. The Bullseye Design and Target are registered trademarks of Target Brands, Inc.
Avoid Scams. Target GiftCards are only accepted at Target stores and Target.com.
For more information visit security.target.com/fraud
Keep gift card for receipt lookups and reloads.
Security notice:
Select new card if silver panel is missing.          I-1 9005-1 (Rev. 11/21)

Gift cards
sleeve included!

◉ Giftcard

536

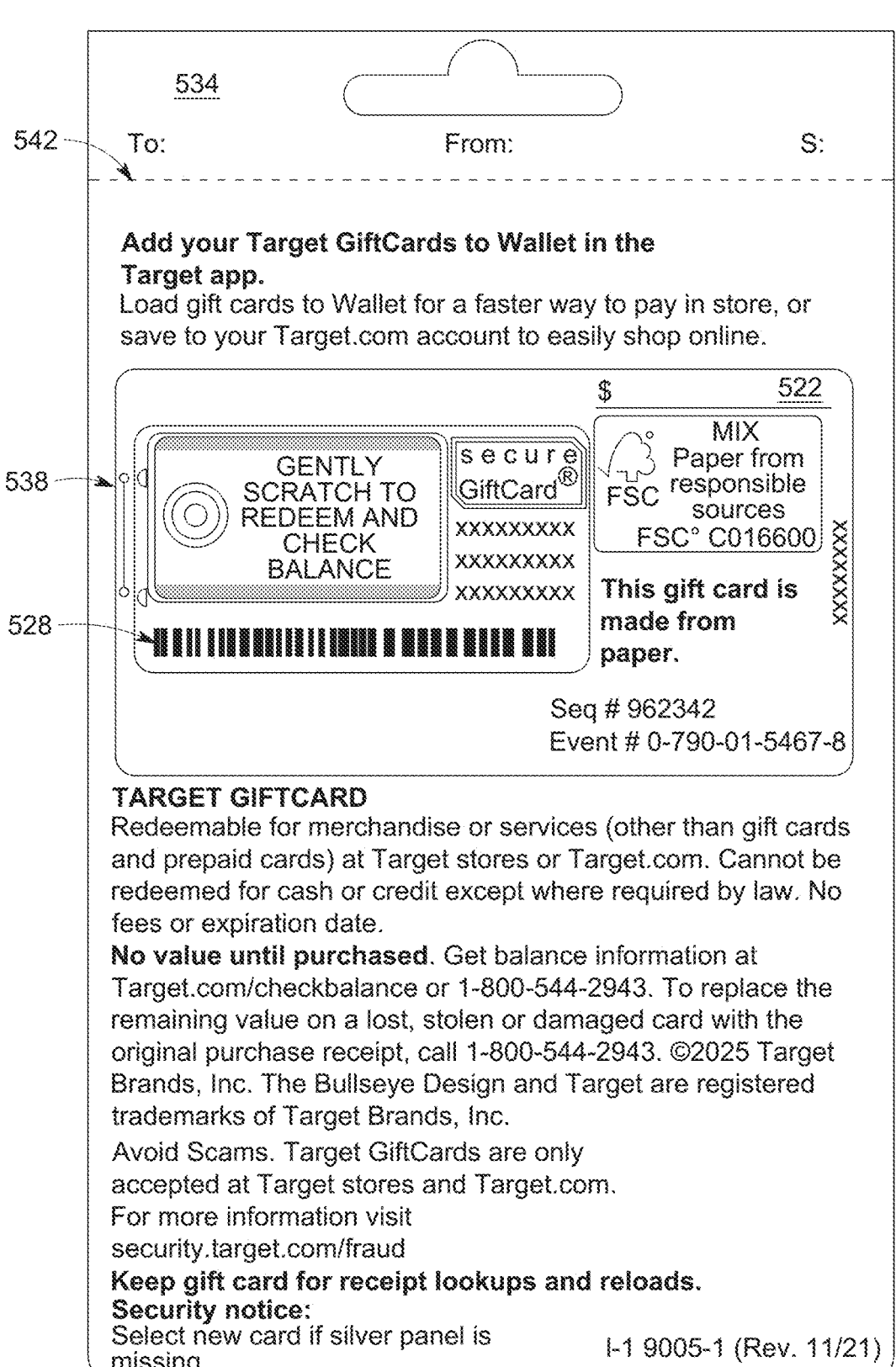

Add your Target GiftCards to Wallet in the Target app.
Load gift cards to Wallet for a faster way to pay in store, or save to your Target.com account to easily shop online.

$    522

GENTLY SCRATCH TO REDEEM AND CHECK BALANCE secure GiftCard®
xxxxxxxxx
xxxxxxxxx
xxxxxxxxx FSC
MIX
Paper from responsible sources
FSC° C016600

This gift card is made from paper.

Seq # 962342
Event # 0-790-01-5467-8

TARGET GIFTCARD
Redeemable for merchandise or services (other than gift cards and prepaid cards) at Target stores or Target.com. Cannot be redeemed for cash or credit except where required by law. No fees or expiration date.
No value until purchased. Get balance information at Target.com/checkbalance or 1-800-544-2943. To replace the remaining value on a lost, stolen or damaged card with the original purchase receipt, call 1-800-544-2943. ©2025 Target Brands, Inc. The Bullseye Design and Target are registered trademarks of Target Brands, Inc.
Avoid Scams. Target GiftCards are only accepted at Target stores and Target.com.
For more information visit security.target.com/fraud
Keep gift card for receipt lookups and reloads.
Security notice:
Select new card if silver panel is missing.

I-1 9005-1 (Rev. 11/21)

Event # 0-790-01-5467-8

TARGET GIFTCARD

Redeemable for merchandise or services (other than gift cards and prepaid cards) at Target stores or Target.com. Cannot be redeemed for cash or credit except where required by law. No fees or expiration date.
No value until purchased. Get balance information at Target.com/checkbalance or 1-800-544-2943. To replace the remaining value on a lost, stolen or damaged card with the original purchase receipt, call 1-800-544-2943. ©2025 Target Brands, Inc. The Bullseye Design and Target are registered trademarks of Target Brands, Inc.

Avoid Scams. Target GiftCards are only accepted at Target stores and Target.com. For more information visit security.target.com/fraud

Keep gift card for receipt lookups and reloads.

Security notice:
Select new card if silver panel is missing.

I-1 9005-1 (Rev. 11/21)

FIG. 5C (Cont'd)

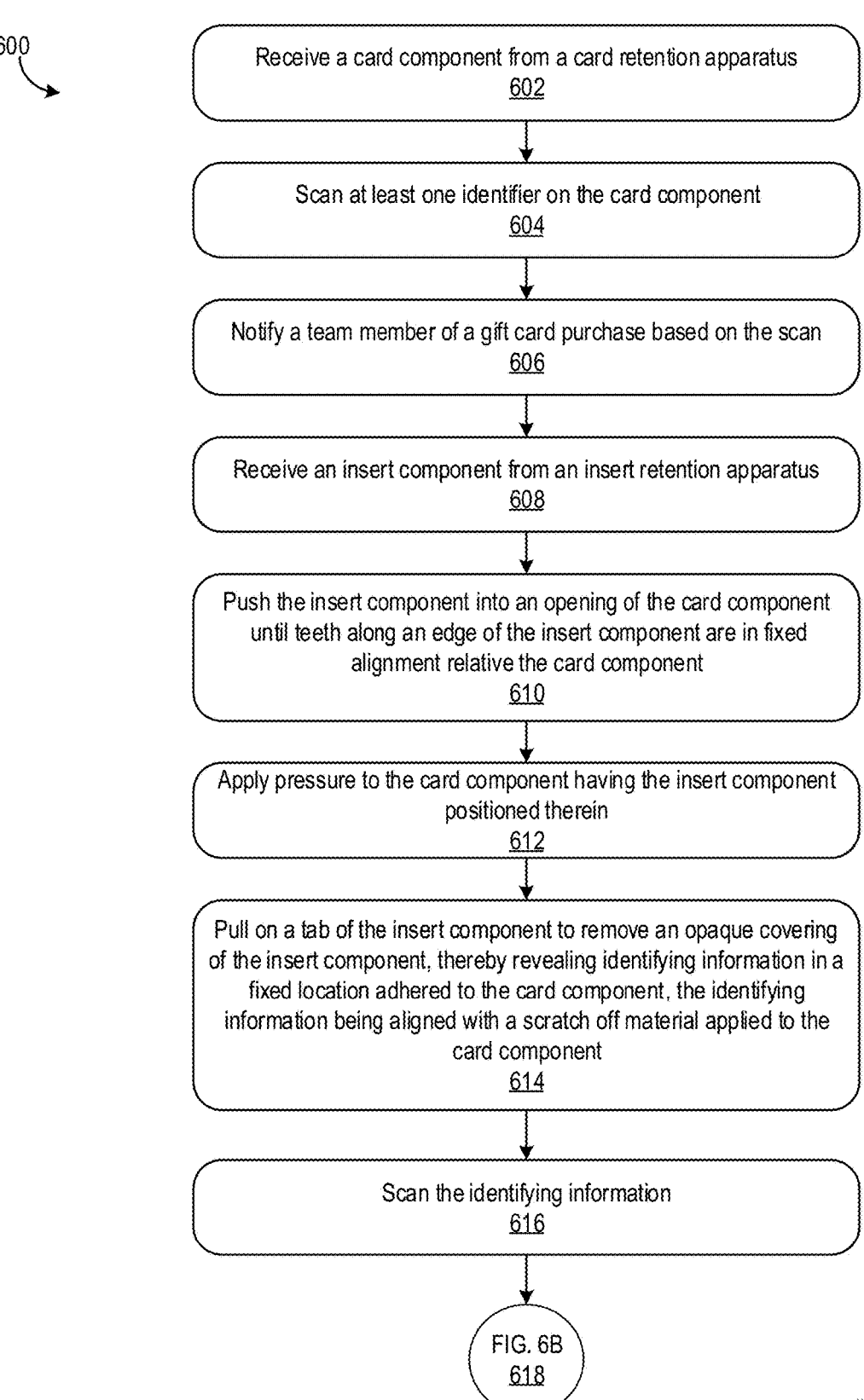

600

Receive a card component from a card retention apparatus
602

Scan at least one identifier on the card component
604

Notify a team member of a gift card purchase based on the scan
606

Receive an insert component from an insert retention apparatus
608

Push the insert component into an opening of the card component until teeth along an edge of the insert component are in fixed alignment relative the card component
610

Apply pressure to the card component having the insert component positioned therein
612

Pull on a tab of the insert component to remove an opaque covering of the insert component, thereby revealing identifying information in a fixed location adhered to the card component, the identifying information being aligned with a scratch off material applied to the card component
614

Scan the identifying information
616

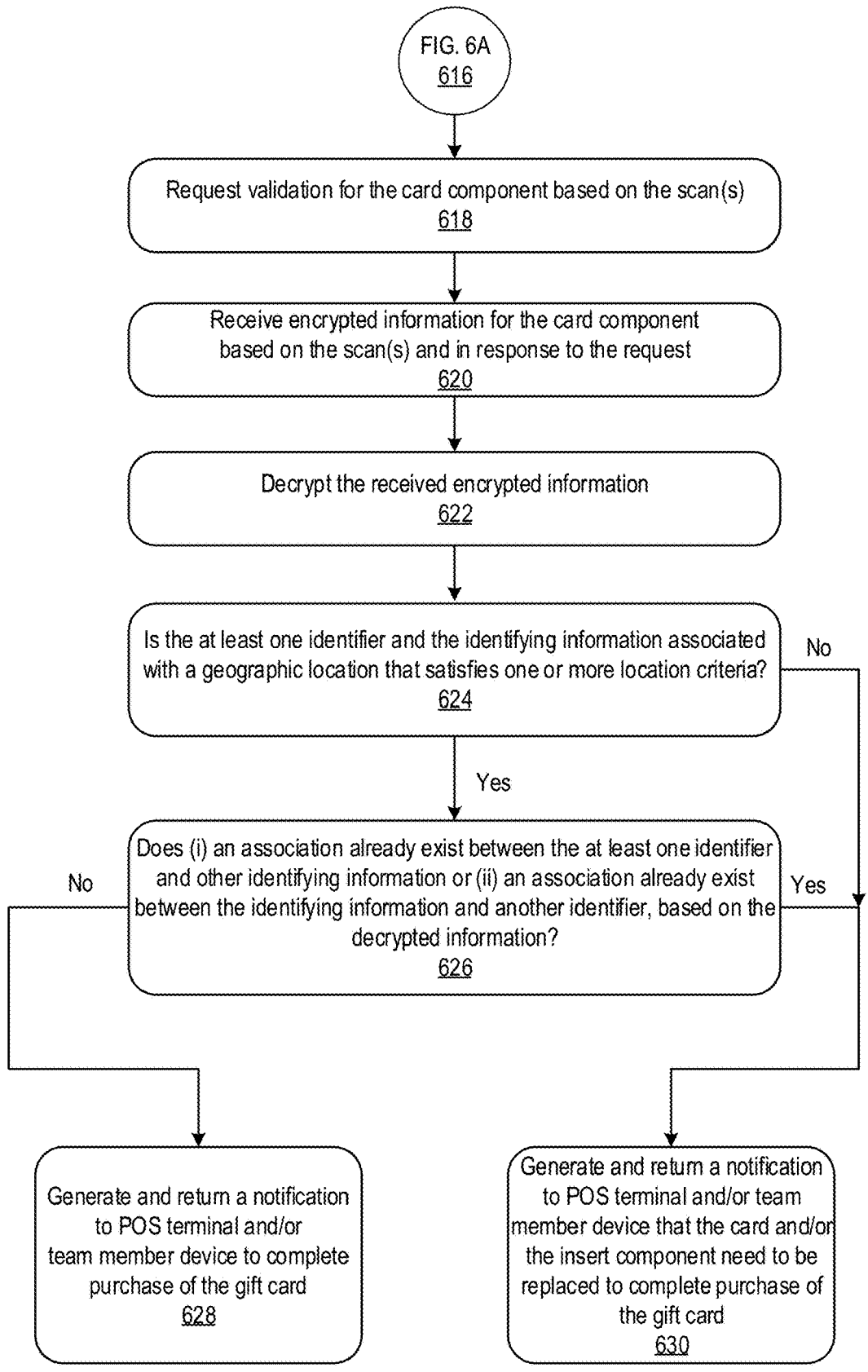

FIG. 6A
616

Request validation for the card component based on the scan(s)
618

Receive encrypted information for the card component
based on the scan(s) and in response to the request
620

Decrypt the received encrypted information
622

Is the at least one identifier and the identifying information associated
with a geographic location that satisfies one or more location criteria?
624

No

Yes

Does (i) an association already exist between the at least one identifier
and other identifying information or (ii) an association already exist
between the identifying information and another identifier, based on the
decrypted information?
626

No

Yes

Generate and return a notification
to POS terminal and/or
team member device to complete
purchase of the gift card
628

Generate and return a notification
to POS terminal and/or team
member device that the card and/or
the insert component need to be
replaced to complete purchase of
the gift card
630

FIG. 6B

SECURE INSERTS FOR GIFT CARDS

INCORPORATION BY REFERENCE

This application claims the benefit of priority of U.S. Provisional Patent Application No. 63/556,137, filed Feb. 21, 2024, the entire contents of which are incorporated by reference herein.

TECHNICAL FIELD

This disclosure generally describes devices, systems, apparatuses, and methods related to combinable gift card components that are configured to be assembled at or during a checkout process in a retail environment, such as a store, to validate and activate a gift card for usage.

BACKGROUND

Physical gift cards have often been made of a plastic material and include a pre-generated unique card number used to identify the card and to redeem the stored value associated with the card. Such pre-generated unique card numbers can be generated and printed on gift cards prior to their placement on a shelf or other retail display, and prior to the gift card being purchased during a retail checkout process.

To provide added security, gift cards have often been pre-generated to include an access number or other validating identifier that is paired with the unique gift card number and used to validate purchases made with the gift card. For example, the gift card can be printed or otherwise generated with the card number and the access number, and then put on a shelf in a retail environment, such as a store. The card number and/or the access number can sometimes be exposed while on display on the shelf. Sometimes, the gift card may be printed with a message, images, or other information on a surface of the card.

When a retail customer purchases the gift card, the card number can be scanned, the purchase of the gift card can be verified, and then the gift card can be activated for redemption by presenting the card number in combination with the access number. Sometimes, the access number can be physically covered on the card with a protective film or other tamper-proof material that can prevent the access number from being viewed unless the film or other tamper-proof material is at least partially removed. To reveal or otherwise view the access number, a customer may scratch off the film or other tamper-proof material.

SUMMARY

The disclosure generally describes systems, methods, and techniques related to gift card components that are configured to be assembled to each other around or during a checkout process in a retail environment, such as a store, to validate and activate the gift card for usage. More specifically, two separate, attachable components, such as a card component and a secure insert component can be combined during the checkout process to reveal identifying information on the card component, which can be used for validating and activating the card component (e.g., the gift card) for usage. The card component can be placed on shelves or other retail stands for selection by a guest. The secure insert component can be maintained in an apparatus in a checkout area, and can be accessed by a team member during the checkout process. The card component can have one or more scannable identifiers, such as barcodes and/or card numbers, which sometimes may be unique across all of those component types (e.g., gift card identifier can be unique with regard to all other identifiers on gift card component type) and on other components may be non-unique with regard to those component types.

The card component can include a window covered by a transparent material, such as cellophane. Identifying information for the card component can be visible through the window. At least a portion of the identifying information, such as a card access number, can be aligned with or otherwise covered by a scratch off material. The scratch off material can be attached to an outer surface of the transparent material. During the checkout process and/or during activation of the card, a guest can scratch off the material to reveal the card access number and one or more other identifying information.

At a time that the card component is on display at the shelves, the identifying information may not be revealed through the window. The identifying information can be initially adhered to the secure insert component. The identifying information can therefore be revealed on the card component as a result of inserting the secure insert component into an opening of the card component and applying pressure to inserted component before pulling the inserted component out from the card component. In other words, the guest can select the card component from display. At checkout, the guest can scan a barcode or other identifier that is visibly printed on the card component. In response to scanning the identifier, a team member can be notified of a gift card purchase and approach the guest with a secure insert component. The team member can insert the secure insert component into the opening of the card component until teeth (e.g., ridges) along the secure insert component mate with teeth inside the card component (which can ensure proper and fixed alignment of the secure insert component relative the card component). The team member can pinch or otherwise press down on the card component, and pull on a pull tab of the secure insert component to remove an adhesive blocker of the secure insert component out from the card component. As the adhesive blocker is removed from the card component, the identifying information on the secure insert component is now revealed through the window and, as mentioned above, at least the portion of the identifying information may be hidden beneath the scratch off material (until the material is removed by the guest or a recipient of the card).

During the checkout process, the guest and/or the team member in the retail environment can scan the identifier on the card component and one or more of the visible identifying information to identify, validate, and activate the card, thereby completing its purchase. When the identifier and visible identifying information are scanned, a backend server system can associate corresponding values to create a new and unique combination of card values (e.g., gift card number and access number combination) that can be used to authenticate and validate the gift card when used. The new combination of values can be stored by the backend server system and can form a new gift card that is being purchased as part of the scanning event. The combined card information can be used and processed during checkout, such as by a point-of-sale (POS) terminal, to validate the gift card, add funds to the card, and activate the card. In some implementations, the identifier and/or the identifying information can be pointers to an access number or other unique card identifier values that are maintained by the backend server system. Therefore, the visible identifier and/or identifying information may not be the unique values that identify the card.

One or more embodiments described herein can include a system for assembling a secure gift card for purchase and use in a retail environment, the system including: a first gift card component of a first type, the first gift card component including a first identifier, a second gift card component of a second type that can be different from the first type, the second gift card component being separate from the first gift card component and including a second identifier, the second gift card component being configured to be permanently attached to the first gift card component to form a combined gift card that is purchasable during a checkout process, a point of sale (POS) terminal that can be configured to process purchase and activation of the combined gift card, and a computer system in network communication with the POS terminal and that can be configured to validate the combined gift card based on the checkout process being performed at the POS terminal to purchase and activate the combined gift card. The POS terminal can perform operations that may include: scanning, using a scanning device at the POS terminal, the first identifier and the second identifier, transmitting, to the computer system, a request to validate the combined gift card, the request including the scanned first identifier and the scanned second identifier, receiving, from the computer system, card validation information indicating that the combined gift card is approved for purchase during the checkout process, the computer system being configured to generate the card validation information by (i) validating the scanned first identifier and the scanned second identifier against gift card associations in a data store, and (ii) generating a data entry in the data store that associates the unique identifiers for the first gift card component and the second gift card component of the combined gift card with each other, activating, based on the card validation information, the combined gift card, and completing, based on the activation and the card validation information, the checkout process.

In some implementations, the embodiments described herein can optionally include one or more of the following features. The second gift card component can be a secure insert component that can be configured to be sized to fit into an opening of the first gift card component and through a channel that may be defined inside and by the first gift card component. The first gift card component can be a card component having a front surface and a back surface, the back surface including a window and a transparent material that can be configured to extend over the window. The back surface further can include a scratch off material that can be affixed to a portion of the transparent material, the scratch off material being configured to hide one or more identifying information for the combined gift card until the scratch off material is removed from the transparent material. The first gift card component can include a middle layer between the front surface and the back surface, the middle layer including a card number, the card number being visible through the window, the card number being positioned underneath the scratch off material, and the scratch off material being configured to hide the card number until the scratch off material is removed from the transparent material.

Sometimes, the first gift card component further can include an opening through which the second gift card component can be configured to be received, a middle layer between the front surface and the back surface of the first gift card component defining a channel for receiving the second gift card component. The channel can include one or more teeth that can be configured to mate with the second gift card component and provide haptic feedback indicating fixed alignment of the second gift card component inside the card component. The second gift card component can include one or more teeth that can be configured to mate with the one or more teeth of the channel. The second identifier of the second gift card component can be visible through the window of the back surface of the first card component. The second gift card component further may include identifying information that can be visible through the window of the back surface of the first card component, the back surface of the first gift card component further including a scratch off material that can be affixed to a portion of the transparent material and that can be configured to hide the identifying information of the second gift card component from being visible through the window until the scratch off material is removed from the transparent material. The identifying information can include a third identifier and an access number.

In some implementations, the second gift card component can be a secure insert component, the secure insert component including: a secure insert portion having at least the second identifier, one or more teeth at a leading edge of the secure insert component, the one or more teeth being configured to mate with corresponding teeth of a middle layer of the first gift card component for fixed alignment of the secure insert component inside the first gift card component, an adhesive-resistant covering that can be double a length of the secure insert portion and that can be configured to fold over the secure insert portion to hide the second identifier from being visible before the secure insert component can be inserted into the first gift card component, and a tab that can be affixed to an end of the adhesive-resistant covering and that can be configured to be pulled to cause the adhesive-resistant covering to unfold out from inside the first gift card component when the secure insert component is inside the first gift card component, where unfolding the adhesive-resistant covering out from inside the first gift card component can be configured to reveal at least the second identifier through the window of the first gift card component.

The secure insert component further can include at least one adhesive attached to the secure insert portion that can be configured to cause the secure insert portion to adhere to a back surface of the transparent material of the first gift card component in response to pulling the tab to unfold the adhesive-resistant covering out from inside the first gift card component. Assembling the first gift card component with the secure insert component can include: pushing the secure insert component in a first direction through the opening defined by the first gift card component until the one or more teeth of the secure insert component mate with the corresponding teeth of the middle layer of the first gift card component, pinching a portion of the first gift card component that includes the secure insert component in fixed alignment inside the first gift card component, and pulling on the tab in a second direction opposite the first direction to cause the adhesive-resistant covering to be removed from the secure insert portion of the secure insert component to reveal at least the second identifier through the window of the back surface of the first gift card component.

As another example, the first gift card component further can include first and second flaps along opposing edges of the front surface of the first gift card component, the first and second flaps being configured to fold over and adhere, via one or more adhesives, to an inner surface of the first gift card component that is opposite the front surface of the first gift card component. The back surface of the first gift card component can be configured to fold over and adhere, via one or more adhesives, to at least a portion of the folded-over first and second flaps and the inner surface of the first gift card component. The folded-over first and second flaps can be configured to form a middle layer of the first gift card component and define a channel through which the second gift card component is received, the channel having a height that can be similar to a height of the second gift card component. The channel can be configured to align with an opening of the first gift card component that can be config-ured to receive the second gift card component. The first flap of the first gift card component can include a card number printed thereon, the card number being visible through the window of the back surface of the first gift card component when the first gift card component is assembled. The second flap of the first gift card component can include one or more teeth that can be configured to mate with one or more teeth of the second gift card component when the first gift card component is assembled and the second gift card component is inserted into the first gift card component.

Sometimes, validating the scanned first identifier and the scanned second identifier can include determining that the first gift card component or the second gift card component may not be associated with another combined gift card. Validating the scanned first identifier and the scanned second identifier can include determining that a geographic location associated with the scanned first gift card component or the second gift card component may match a geographic loca-tion that the first gift card component or the second gift card component was initially associated with. The first identifier or the second identifier can include a pointer that, when scanned, may cause the POS terminal to (i) access the computer system and (ii) retrieve, based on the pointer, identifying information associated with the first identifier or the second identifier, respectively. The first gift card com-ponent can be removably attached to a retention apparatus of a display at a retail environment and the second gift card component can be dispensed from a retention apparatus in a checkout area of the retail environment. The data entry that associates the unique identifiers for the first gift card com-ponent and the second gift card component can include a unique value that can include the first identifier and the second identifier.

One or more embodiments described herein can include a gift card having a first gift card component of a first type, the first gift card component including a first identifier, and a second gift card component of a second type that can be different from the first type, the second gift card component being separate from the first gift card component and including at least a second identifier, the second gift card component being configured to be permanently attached to the first gift card component during a checkout process to form a combined gift card.

The gift card can optionally include one or more of the following features. The second gift card component can be a secure insert component that can be configured to be sized to fit into an opening of the first gift card component and through a channel that is defined inside and by the first gift card component. The first gift card component can be a card component having a front surface and a back surface, the back surface including a window and a transparent material that can be configured to extend over the window. The back surface further can include a scratch off material that can be affixed to a portion of the transparent material, the scratch off material being configured to hide one or more identifying information for the combined gift card until the scratch off material is removed from the transparent material.

The first gift card component can include a middle layer between the front surface and the back surface, the middle layer including a card number, the card number being visible through the window, the card number being positioned underneath the scratch off material, and the scratch off material being configured to hide the card number until the scratch off material is removed from the transparent mate-rial. The first gift card component further can include an opening through which the second gift card component can be configured to be received, a middle layer between the front surface and the back surface of the first gift card component defining a channel for receiving the second gift card component. The channel can include one or more teeth configured to mate with the second gift card component and provide haptic feedback indicating fixed alignment of the second gift card component inside the card component. The second gift card component can include one or more teeth that can be configured to mate with the one or more teeth of the channel. The second identifier of the second gift card component can be visible through the window of the back surface of the first card component.

The second gift card component further can include identifying information that can be visible through the window of the back surface of the first card component, the back surface of the first gift card component further includ-ing a scratch off material that can be affixed to a portion of the transparent material and that can be configured to hide the identifying information of the second gift card compo-nent from being visible through the window until the scratch off material is removed from the transparent material. The identifying information can include a third identifier and an access number.

In some implementations, the second gift card component can include a secure insert component, the secure insert component further including: a secure insert portion having at least the second identifier, one or more teeth at a leading edge of the secure insert component, the one or more teeth being configured to mate with corresponding teeth of a middle layer of the first gift card component for fixed alignment of the secure insert component inside the first gift card component, an adhesive-resistant covering that can be double a length of the secure insert portion and that can be configured to fold over the secure insert portion to hide the second identifier from being visible before the secure insert component is inserted into the first gift card component, and a tab that can be affixed to an end of the adhesive-resistant covering and that can be configured to be pulled to cause the adhesive-resistant covering to unfold out from inside the first gift card component when the secure insert component is inside the first gift card component. Unfolding the adhe-sive-resistant covering out from inside the first gift card component can be configured to reveal at least the second identifier through the window of the first gift card compo-nent. The secure insert component further can include at least one adhesive attached to the secure insert portion that can be configured to cause the secure insert portion to adhere to a back surface of the transparent material of the first gift card component in response to pulling the tab to unfold the adhesive-resistant covering out from inside the first gift card component.

Sometimes, assembling the first gift card component with the secure insert component can include: pushing the secure insert component in a first direction through the opening defined by the first gift card component until the one or more teeth of the secure insert component mate with the corre-sponding teeth of the middle layer of the first gift card component, pinching a portion of the first gift card component that includes the secure insert component in fixed alignment inside the first gift card component, and pulling on the tab in a second direction opposite the first direction to cause the adhesive-resistant covering to be removed from the secure insert portion of the secure insert component to reveal at least the second identifier through the window of the back surface of the first gift card component.

The first gift card component further can include first and second flaps along opposing edges of the front surface of the first gift card component, the first and second flaps being configured to fold over and adhere, via one or more adhesives, to an inner surface of the first gift card component that can be opposite the front surface of the first gift card component. The back surface of the first gift card component can be configured to fold over and adhere, via one or more adhesives, to at least a portion of the folded-over first and second flaps and the inner surface of the first gift card component. The folded-over first and second flaps can be configured to form a middle layer of the first gift card component and can define a channel through which the second gift card component is received, the channel having a height that can be similar to a height of the second gift card component. The channel can also be configured to align with an opening of the first gift card component that can be configured to receive the second gift card component. The first flap of the first gift card component can include a card number printed thereon, the card number being visible through the window of the back surface of the first gift card component when the first gift card component is assembled. The second flap of the first gift card component can include one or more teeth that can be configured to mate with one or more teeth of the second gift card component when the first gift card component is assembled and the second gift card component is inserted into the first gift card component.

One or more embodiments described herein can include a gift card having a card component including a front surface, a back surface, a window on the back surface, and a first identifier, and a secure insert component including: a secure insert portion having at least a second identifier, one or more teeth at a leading edge of the secure insert component, the one or more teeth being configured to mate with corresponding teeth of a middle layer of the card component for fixed alignment of the secure insert component inside the card component, an adhesive-resistant covering that can be double a length of the secure insert portion and that can be configured to fold over the secure insert portion to hide the second identifier from being visible before the secure insert component is inserted into the card component, and a tab that can be affixed to an end of the adhesive-resistant covering and that can be configured to be pulled to cause the adhesive-resistant covering to unfold out from inside the card component when the secure insert component is inside the card component, where unfolding the adhesive-resistant covering out from inside the card component can be configured to reveal at least the second identifier through the window of the card component, where the card component can be configured to receive the secure insert component during a checkout process to form a combined gift card.

The gift card can optionally include one or more of the following features. For example, the secure insert component further can include at least one adhesive attached to the secure insert portion that can be configured to cause the secure insert portion to adhere to a back surface of the transparent material of the card component in response to pulling the tab to unfold the adhesive-resistant covering out from inside the card component. Assembling the card component with the secure insert component can include: pushing the secure insert component in a first direction through the opening defined by the card component until the one or more teeth of the secure insert component mate with the corresponding teeth of the middle layer of the card component, pinching a portion of the card component that includes the secure insert component in fixed alignment inside the card component, and pulling on the tab in a second direction opposite the first direction to cause the adhesive-resistant covering to be removed from the secure insert portion of the secure insert component to reveal at least the second identifier through the window of the back surface of the card component.

In some implementations, the card component further can include first and second flaps along opposing edges of the front surface of the card component, the first and second flaps being configured to fold over and adhere, via one or more adhesives, to an inner surface of the card component that can be opposite the front surface of the card component. The back surface of the card component can be configured to fold over and adhere, via one or more adhesives, to at least a portion of the folded-over first and second flaps and the inner surface of the card component. The folded-over first and second flaps can be configured to form a middle layer of the card component and can define a channel through which the secure insert component can be received, the channel having a height that can be similar to a height of the secure insert component. The channel can also be configured to align with an opening of the card component that can be configured to receive the secure insert component. The first flap of the card component can include a card number printed thereon, the card number being visible through the window of the back surface of the card component when the card component is assembled. The second flap of the card component can include one or more teeth that can be configured to mate with one or more teeth of the secure insert component when the card component is assembled and the secure insert component is inserted into the card component.

The devices, system, and techniques described herein may provide one or more of the following advantages. For example, the disclosed technology can be used to ensure that, when assembling card components at checkout, a team member does not accidentally put a label with card access information on a card component that the label was not intended for. At checkout, the team member easily and properly insert a secure insert component into the card component by aligning the secure insert component with an opening of the card component and pushing the secure insert component through the opening into the card component until teeth of the secure insert component mate with corresponding teeth inside the card component. The mating of teeth, or similar alignment components/design can signify proper alignment of the components. The teeth can also act as small ramps and may only be used on a bottom part of the secure insert component in order to push the component up to better ensure a top part of the component registers against an upper part, or flap, of an insert cavity defined by the card component (a card number value already being printed on the upper part or flap of the inner cavity). This configuration can ensure that an access number printed on the secure insert component does not appear to be drifting down and instead remains at a topmost position underneath a scratch off material. If the access number were to drift down, it may become obscured by a portion of the scratch off that can limit visibility of information beneath it.

Furthermore, a pull-tab adhered to an adhesive blocker can cover a barcode or other identifying information until such time that the tab is pulled to remove the adhesive blocker and the card is fully assembled. This configuration reduces possibility of 2 barcodes (card number and access code) being scanned without being physically combined into a completed card. The disclosed card configuration can also ensure proper placement of barcodes and access code on the card via guidance provided by the design and shape of the secure insert component and the card component.

As another example, the disclosed technology can limit or otherwise prevent an ability of users to steal or otherwise compromise gift card access numbers and subsequently drain card funds upon activation of those cards. A guest and/or team member must combine two separate components, a card and a secure insert, at a checkout process, where each of the components has identifying information. The components are combined in such a way that the identifying information for both components can be scannable at checkout to verify and activate the card. The required combination of components and scanning can limit or otherwise prevent malicious users from compromising gift card information and draining associated funds, thereby ensuring increased security of the gift card information and gift cards more generally in retail environments. The disclosed technology can improve guest experiences with the retail environment for the reasons herein. As another example, data encryption techniques can be used to ensure that identifying information for gift cards may not be intercepted during transmission between different system components (e.g., POS terminals, remote computer systems, team member computing devices).

The details of one or more implementations are set forth in the accompanying drawings and the description below. Other features and advantages will be apparent from the description and drawings, and from the claims.

BRIEF DESCRIPTION OF THE DRAWINGS

FIG. 3F is a conceptual diagram of an assembled card component of FIG. 3D.

FIGS. 6A and 6B is a flowchart of a process for assembling a card component with a secure insert component and purchasing the combined components as a gift card.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to combinable components for generating gift cards during a checkout process in retail environments, such as stores. The disclosed techniques provide a secure insert component having a tab and card identifying information, which can be inserted into an opening of a card component. Once a leading edge of the secure insert component mates with a defined edge in the card component, the tab can be pulled out from the secure insert component, thereby revealing the card identifying information on the card component. The identifying information can be visible through a window on the card component. Moreover, the window can be covered with a transparent material, such as cellophane, and a scratch off material or similar security material can be applied to a portion of the transparent material. The scratch off material can hide at least a portion of the identifying information from visibility until the scratch off material is removed from the card component (such as when the card is being activated by a recipient of the card).

Figure 1A:
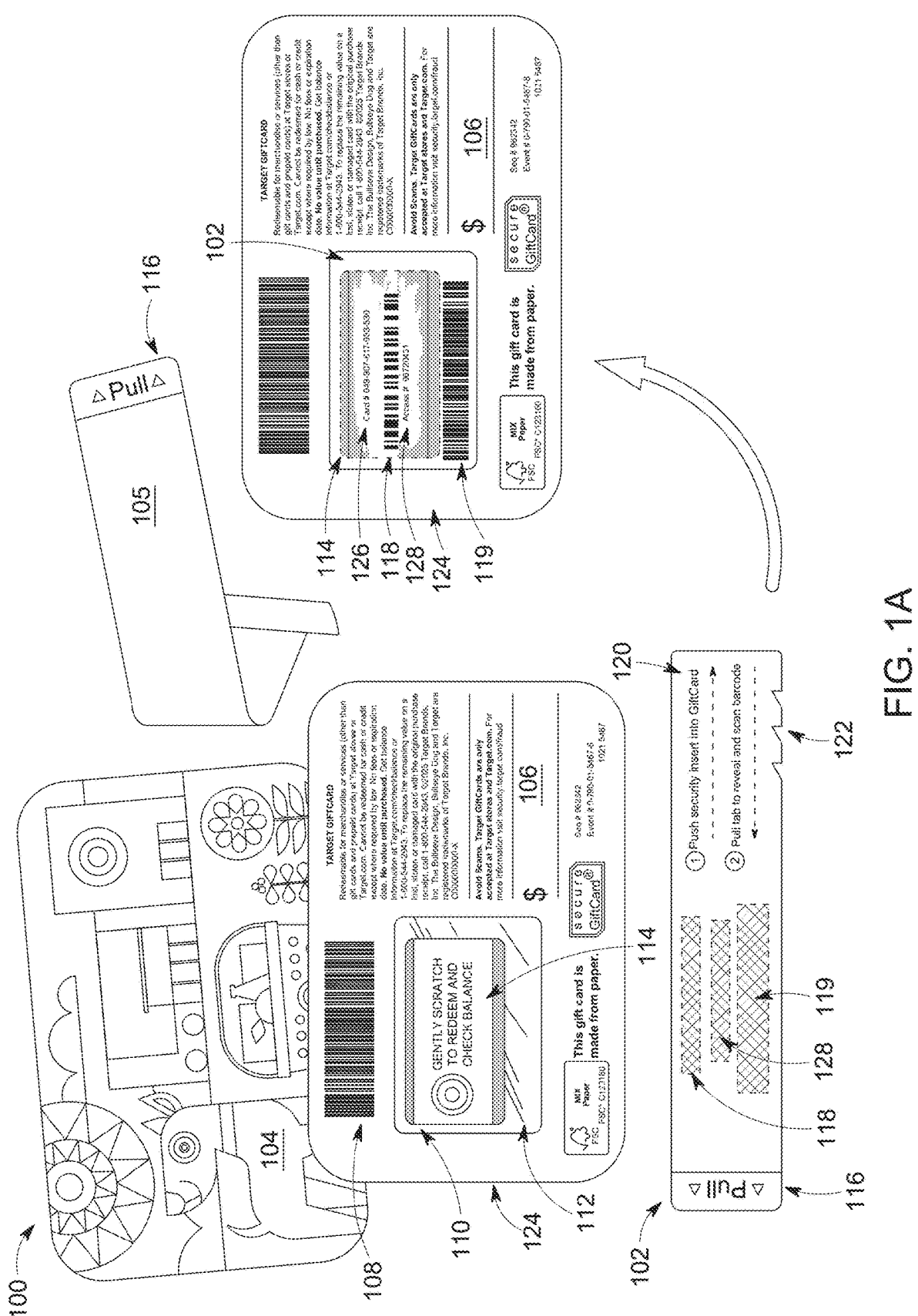
FIG. 1A is a conceptual diagram of a card component and a secure insert component, which can be combined to form a gift card.

Referring to the figures, FIG. 1A is a conceptual diagram of a card component 100 and a secure insert component 102, which can be combined to form a gift card. The card component 100 can be an incomplete gift card. The card component 100 can sometimes include an envelope, sleeve, insert, and/or film, which can form the gift card. In some implementations, the card component 100 can include a combination of a card and an envelope.

The card component 100 can include a front surface 104 and a back surface 106. The front surface 104 can include graphics, art, and/or text. The back surface 106 can include information associated with the card component 100. For example, the back surface 106 can include an identifier 108 (e.g., barcode), which can identify the card component 100 and/or artwork printed on the front surface 104 of the card component 100. The back surface 106 can include a window 110, through which identifying information about the card component 100 may be or become visible. For example, a card number 126 can be printed onto the card component 100 and visible through the window 110 on the back surface 106 of the card component 100. A transparent material 112, such as cellophane, can be attached over the window 110, thereby preventing a potentially malicious user from altering any of the identifying information that may be visible through the window 110. A scratch off material 114 or other similar material can be attached (e.g., affixed, adhered) to a portion of the window 110 to prevent at least some of the identifying information from being visible through the window 110. One the material 114 is scratched off (e.g., by a guest using a coin), all of the identifying information may be visible through the window 110. The card component 100 can include an opening 124 along an edge of the card component 100, which can be sized to receive the secure insert component 102.

The secure insert component 102 can include an insert portion 120, a tab 116 opposite the insert portion 120, identifiers 118 and 119 (e.g., barcodes), and an access number 128. In some implementations, the identifier 119 can be scanned and used to associate the secure insert component 102 with the card number 126 of the card component 100. For example, the identifier 119 can be a unique barcode for the secure insert component 102, such as a 26-digit numeric value. The identifier 119 can be scanned and used to associate the uniquely numbered secure insert component 102 to the uniquely numbered card component 100. The identifier 119 can keep the access number 128 for redemption hidden. The identifier 118 can be a barcode representation of an 8-digit access code (e.g., the access number 128), which may or may not be unique for the secure insert component 102. The identifier 118 can easily be scanned in lieu of typing in the access number 128. The access number 128 can be an 8-digit access code. The access number 128 can sometimes be a pointer to actual, unique identifying values for the secure insert component 102 and/or the card component 100. The insert portion 120 can include teeth 122 (e.g., ridges), which can be configured to mate with corresponding teeth of the card component 100 when the secure insert component 102 is inserted into the card component 100 via the opening 124. The secure insert component 102 further can include an adhesive-resistant covering 105 (e.g., a tab made of at least one material that includes an adhesive-resistant material), which can be configured to attach to the tab 116 and fold over the insert portion 120 having the identifiers 118 and 119 and the access number 128.

As described further below, once the teeth 122 of the insert portion 120 mate with the corresponding teeth of the card component 100, the guest and/or team member understands that the secure insert component 102 is in fixed and proper alignment relative the card component 102. Therefore, the guest and/or team member can pinch or otherwise apply pressure to the card component 102 with the inserted secure insert component 102 before pulling on the tab 116. Pulling on the tab 116 can cause the adhesive-resistant covering 105 to unfold out of the opening 124 of the card component 100, thereby revealing the identifiers 118 and 119 and the access number 128 through the window 110, underneath the transparent material 112, and on the card component 100. In other words, the adhesive-resistant covering 105, which covers adhesive on the secure insert component 102, can be pulled out from the card component 100. When removed or pulled out, the covering 105 reveals information 118, 119, and 128 on the secure insert component 102 and also uncovers the adhesive, which can cause the security insert component 102 to adhere to an inner side of the transparent material 112 on the card component 100. As shown and described herein, the scratch off material 114 can be configured to cover the card number 126, the identifier 118, and the access number 128, until the material 114 is scratched off/removed from the transparent material 112.

Any of the identifiers 108, 118, and/or 119 may not be actual access codes or unique identifying values for the card component 100. Rather, the identifier 108 can be a unique identifier for the card component 100 and the identifiers 118, and 119 can be unique identifiers for the secure insert component 102. The identifiers 108 and/or 119 can represent 26-digit barcodes, which can be stored in a database and/or by a remote server system in association with the access code number 128 and other unique identifying card values for the card component 100. Because the identifiers 108, 118, and/or 119 are not the unique identifying card values themselves, secrecy and security of the unique identifying card values can be maintained, thereby preventing a possibility that a user scans multiple card components and secure insert components, pairs those components incorrectly, and/ or never combines the card components with the secure insert components. During a checkout process, the identifiers 108 and 119 can be scanned in order to (i) verify both the card component 100 and the secure insert component 102, (ii) associate a combination of the card component 100 and the secure insert component 102, (iii) add funds to the card component 100, (iv) activate the card component 100, or any combination thereof.

The card component 100 and the secure insert component 102 described herein can be used by any gift cards being sold at the retail environment (e.g., third party gift cards and gift cards that are directly associated with the retail environment). Sometimes, third parties can provide their own card components, which can nevertheless be combined with the secure insert components 102 described herein and provided by the retail environment. In some implementations, the third parties can provide their own card components and secure insert components, which can follow one or more guidelines (e.g., standards, certification) that are provided by the retail environment. The guidelines can be used to ensure that all gift card assemblies, regardless of whether the gift cards are from third parties or directly from the retail environment, can be uniformly secure to prevent potentially malicious actors from obtaining gift card information and compromising the gift cards.

In some implementations, the card component 100 can be printed with text such as "Secure gift card." Such text can be part of a generic logo that can be applied to all card components, whether they are card components provided by the retail environment or provided by the third parties. This text can improve guest experience by giving the guests peace of mind that security measures have been taken to ensure their gift cards are unlikely to be compromised.

Figure 1B:
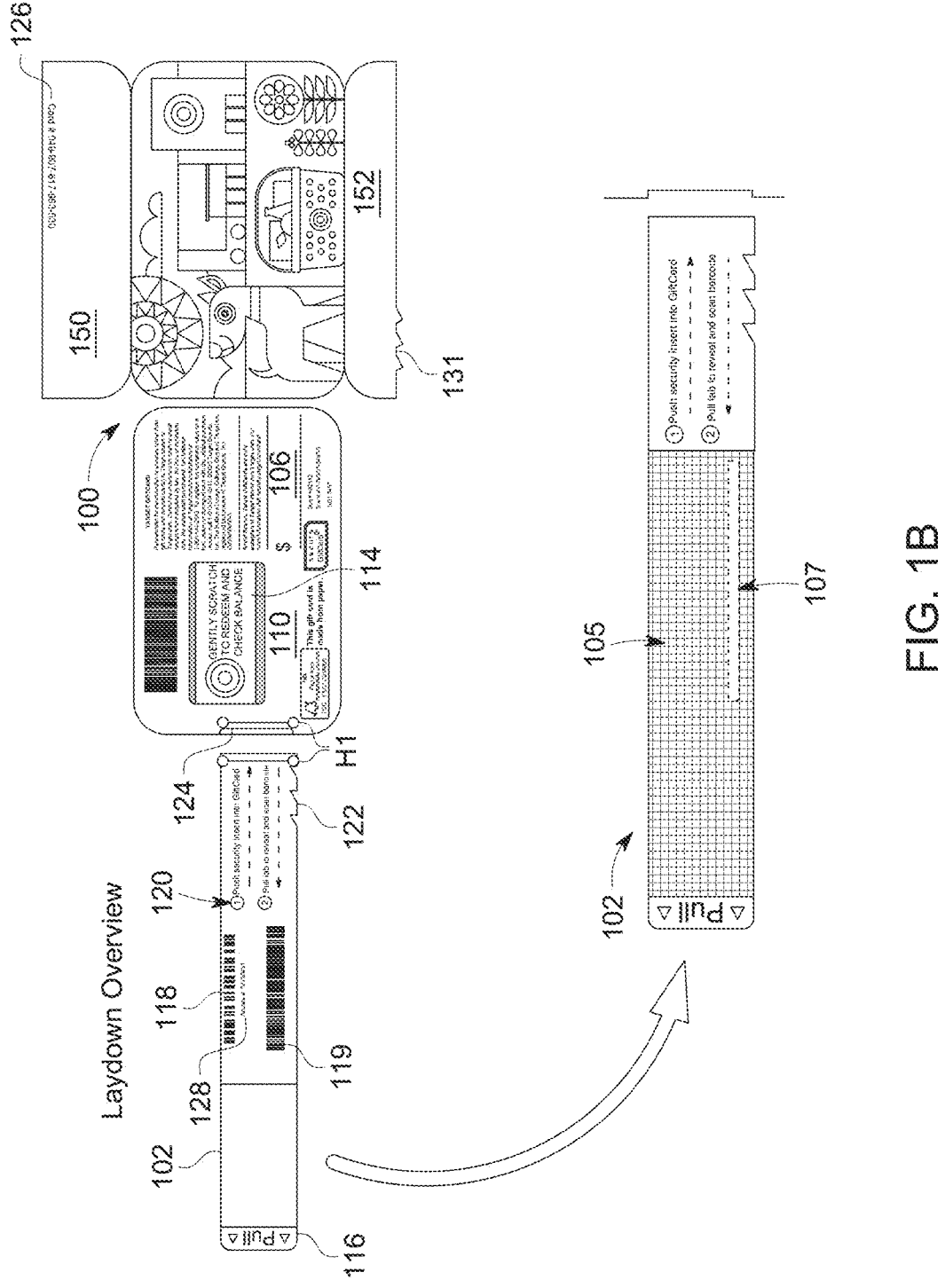
FIG. 1B is a conceptual diagram of a secure insert component.

FIG. 1B is a conceptual diagram of the secure insert component 102. As described above in reference to FIG. 1A, the secure insert component 102 can include the insert portion 120 having the teeth 122, the identifiers 118 and 119, and the access number 128. The adhesive-resistant covering 105 can also be attached to the secure insert component 102 and can cover a portion of the insert portion 120, such as the portion including the identifiers 118 and 119 and the access number 128. More particularly, the adhesive-resistant covering 105 can fold over this portion of the secure insert component 102 such that when the tab 116 is pulled out from the assembled card component 100 and the secure insert component 102, the adhesive-resistant covering 105 is removed (unfolded) to reveal the identifiers 118 and 119 and the access number 128 (the insert portion 120 remains assembled inside the card component 100).

The adhesive-resistant covering 105 can be made of a material that is opaque, to ensure that the identifiers 118 and 119 and the access number 128 are hidden until the secure insert component 102 is properly inserted into the card component 100 and the tab 116 is pulled to reveal such identified information for scanning (more specifically, the identifier 119). The identifier 119 can be a unit ID barcode, which can be used to associate the secure insert component 102 with the card component 100. Associating the secure insert component 102 with the card component 100 can include giving the card component 100 the associated access number 128 and the corresponding identifier 118 (e.g., another unit ID barcode) found on the secure insert component 102, both of which are hidden under the scratch off material 114.

The adhesive-resistant covering 105 can be a single material or may be a composite of layers. Regardless, the adhesive-resistant covering 105 can have strength to be pulled and removed in a rolling-off fashion from adhesive 107 to the insert portion 120 of the secure insert component 102 without shearing or delaminating. In other words, the shear strength of the material of the adhesive-resistant covering 105 can be greater than the shear force that is generated by opposing forces of the adhesive 107 holding the adhesive-resistant covering 105 to the secure insert component 102 and the pull force applied to remove it. As force increases with velocity, the material of the adhesive-resistant covering 105 can withstand the force generated even by a user pulling the tab 116 on the material of the adhesive-resistant covering 105 in what may be considered a rapid manner. There may be no requirement to pull the tab 116 slowly to keep shear forces below a threshold where the material of the adhesive-resistant covering 105 would lose its structural integrity.

Information can be printed onto the adhesive-resistant covering 105, such as "PULL" on the tab 116. The tab 116 can be attached to the secure insert component 102 such that the tab 116 sits over the adhesive resistant covering 105, adhesive on the secure insert component 102 beneath the covering 105, and the identifiers 118 and 119 and the access number 128 printed directly onto the insert portion 120. Suitable inks can be used that can absorb slightly to the surface of the secure insert component 102 and/or adhere well enough to be permanent, despite the material of the component 102 resisting permanent adhesion to the adhesive 107 used between the adhesive-resistant covering 105 and at least the access number 128 on the insert portion 120 of the secure insert component 102. The information can be printed directly to the material of the component 102, the material being one substance type. If laminated material is used for the adhesive-resistant covering 105, the printing of information may be completed at any point during or after the laminating process to produce the component 102.

The secure insert component 102 can have a height H1, which corresponds to a height H1 of the opening 124 of the card component 100. As a result, the secure insert component 102 can be easily and correctly inserted into the card component 100 via the opening 124.

The card component 100 can include flaps 150 and 152, which can fold over when assembling the card component 100, thereby creating a channel or gap through which the secure insert component 102 can be received. The flap 150 can include the card number 126, which can be visible from the back surface 106 of the card component 100 through the window 110. The flap 152 can include teeth 131, which can correspond to and mate with the teeth 122 of the secure insert component 102 when the secure insert component 102 is inserted/pushed into the card component 100 via the opening 124. A base material of the secure insert component 102 can be a same thickness as a middle layer of the card component 100 that is formed when the flaps 150 and 152 of the card component 100 are folded over to create a space/gap for receiving the secure insert component 102. Refer to FIGS. 3A, 3B, 3C, 3D, 3E, 3F, and 3G for further discussion.

Figure 1C:
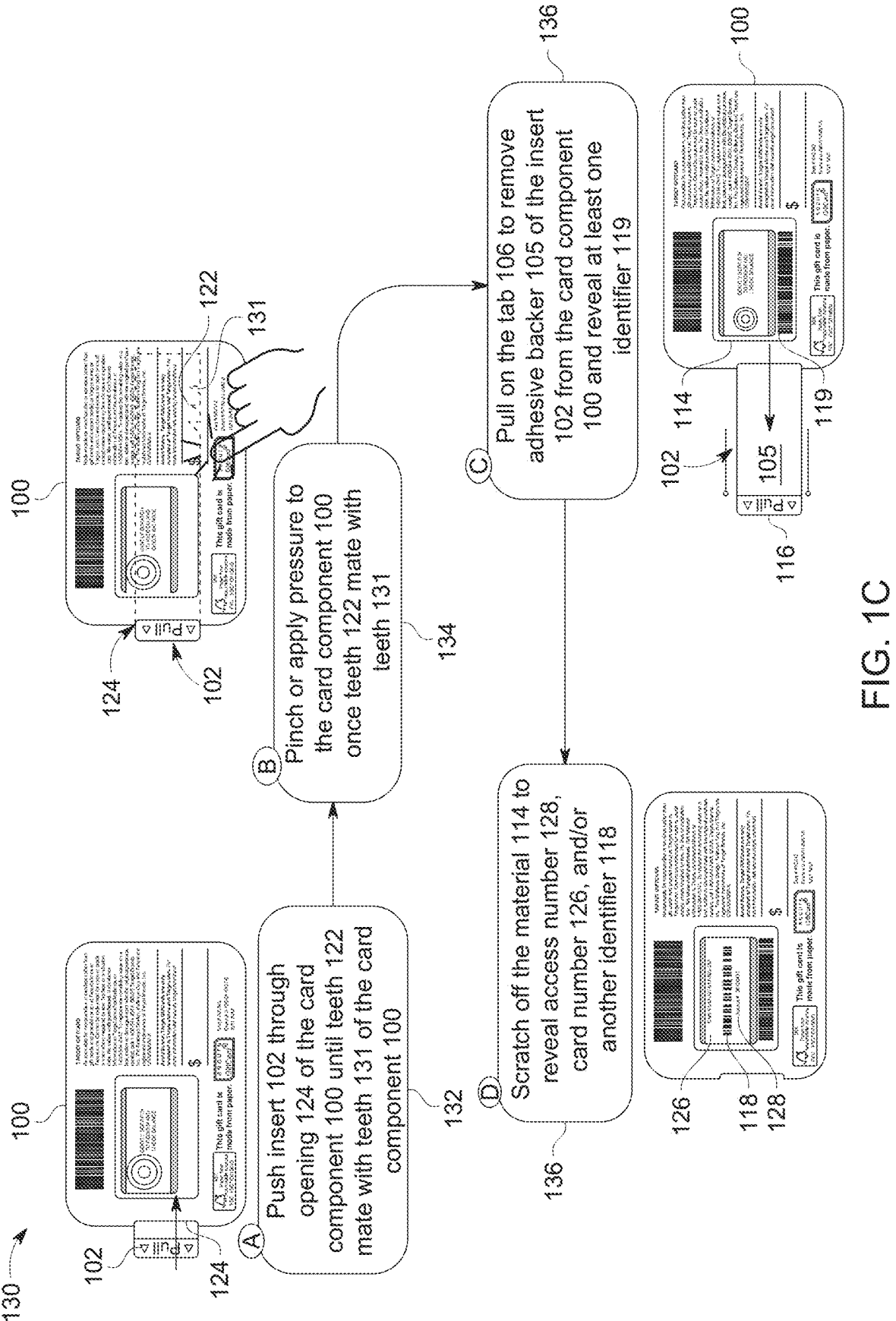
FIG. 1C is a conceptual diagram of a process for combining a card component with a secure insert component to form a gift card.

FIG. 1C is a conceptual diagram of a process 130 for combining the card component 100 with the secure insert component 102 to form a gift card. The process 130 can be performed by a guest and/or team member in a retail environment, such as a store. The process 130 can be performed during a checkout process. Sometimes, the process 130 may be performed by the team member, in response to the guest scanning an identifier on the card component 100 during the checkout process, thereby indicating the guest's desire to purchase a gift card.

In manual (e.g., belted) checkout lanes, the team member (e.g., cashier) can scan the card component 100 and then be prompted by a POS terminal at the lane to insert the secure insert component 102 into the card component 100 then scan the secure insert component 102. In self-checkout lanes, the guest can scan the card component 100, which then alerts the team member (such as by changing a color or blinking of a light associated with the self-checkout lane) that the secure insert component 102 is needed for the guest. The team member can bring the secure insert component 102 to the guest, assemble the components 100 and 102, and complete the portion of the guest's transaction for the gift card purchase before permitting the guest to return to self-checkout for the remaining transaction. For illustrative purposes, the process 130 is described from the perspective of a user.

Referring to the process 130, the user can push the secure insert component 102 through the opening 124 of the card component 100 until the teeth 122 mate with the teeth 131 (e.g., notches) of the card component 100 (block A, 132). The mating teeth 122 and 131 can provide a feeling/sensation to the user that indicates the secure insert component 102 has successfully been pushed deep enough into the card component 100 and that the secure insert component 102 is properly aligned therein. In other words, when the teeth 122 mate with or otherwise hit each of the teeth 131, the resulting impact can provide haptic feedback so that the user knows they have properly inserted the secure insert component 102 into the card component 100.

In block B (134), the user can pinch or otherwise apply pressure to the card component 100 once the teeth 122 mate with the teeth 131. The mating of the teeth 122 and 131 is shown in FIG. 1C with dotted lines. Pinching the card component 100 with the secure insert component 102 inserted therein can provide for maintaining the secure insert component 102 in place as block C (136) is performed.

In block C (136), the user can pull on the tab 116 of the secure insert component 102 to pull the adhesive-resistant covering 105 out from inside the card component 100. The adhesive-resistant covering 105 was initially attached to the secure insert component 102 to hide identifying information on the secure insert component 102 from being visible. The identifying information is described in reference to FIGS. 1A and 1B. The identifying information can include at least the identifier 119. The other identifying information can be hidden behind the scratch off material 114 that may also be applied to the card component 100.

The user may scratch off the material 114 to reveal the access number 128, the card number 126, and/or the identifier 118 (block D, 136). Any of this identifying information can then be scanned during the checkout process, as described further below, to verify the card component 100 and the secure insert component 102, associate the components 100 and 102, and complete purchase of this gift card.

Figure 2:
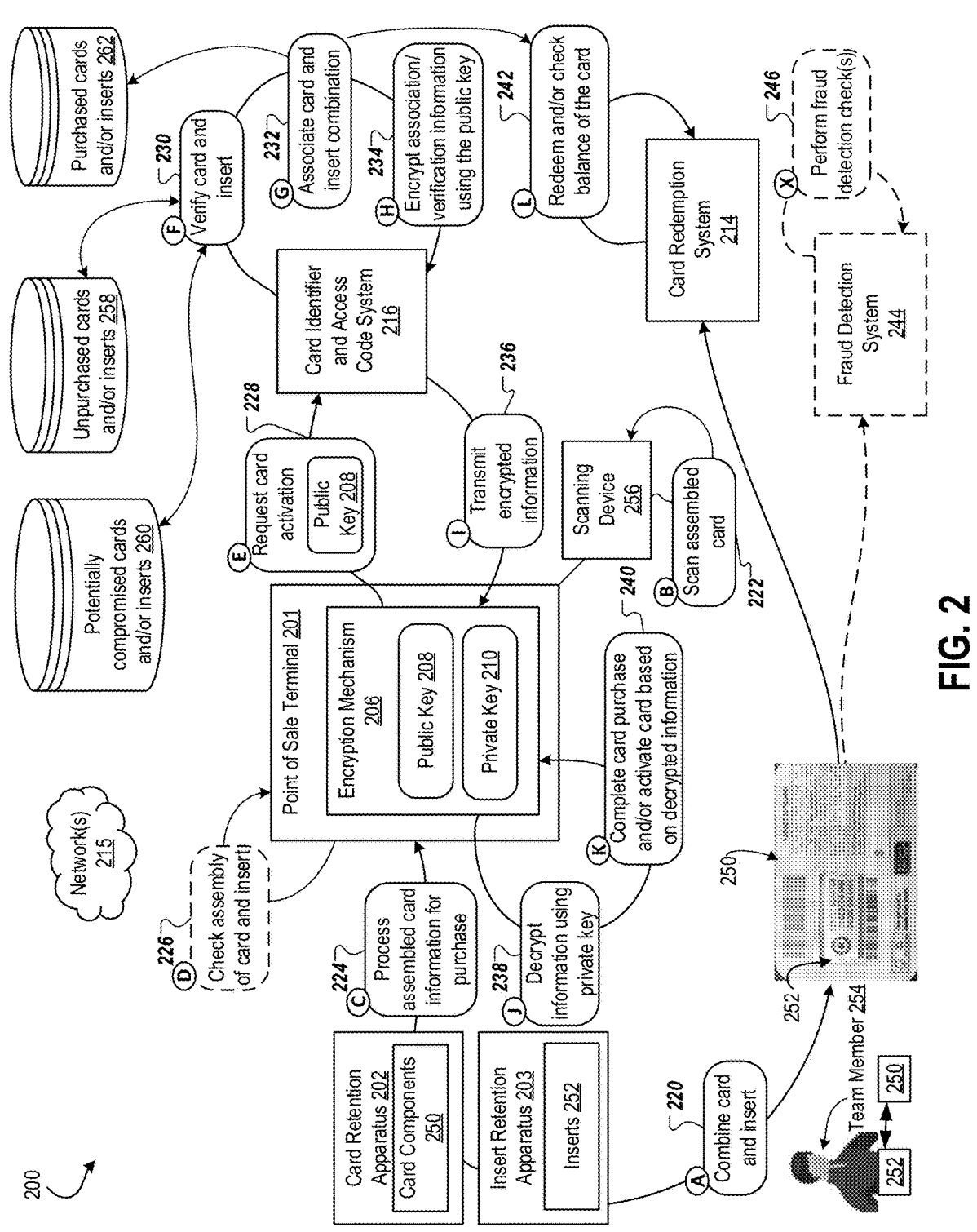
FIG. 2 is a system diagram of one or more system components used for performing the disclosed techniques.

FIG. 2 is a system diagram of one or more system components used for performing the disclosed techniques. The system 200 can include the POS terminal 201, a card identifier and access code system 216, a card retention apparatus 202, an insert retention apparatus 203, an optional fraud detection system 224, a card redemption system 214, a scanning device 256, a potentially compromised cards and/or inserts data store 260, an unpurchased cards and/or inserts data store 258, and a purchases cards and/or inserts data store 262. In some implementations one or more of the data stores 258, 260, and 262 can be part of a single data store, data repository, network of storage devices, and/or cloud storage system. The components 201, 216, 224, 214, 256, 260, 258, and 262 can communicate (e.g., wirelessly, wired) via the network(s) 215.

The card retention apparatus 202 can be configured to retain card components 250, such as the card component 100 described herein. The apparatus 202 can be a display on one or more shelves in a retail environment from which a guest can select the card component 250 of their choosing, for purchase as a gift card.

The insert retention apparatus 203 can be configured to retain insert components 252, such as the secure insert component 102 described herein. The apparatus 203 can be in a secured location in a checkout area such that only a team member 252 can access the apparatus 203 to retrieve the secure insert component 252.

The POS terminal 201 can be configured to process and/or complete purchases during a checkout process in the retail environment, such as a purchase of a gift card that is made up of the card component 250 combined with the insert component 252. A checkout area in the retail environment can include a plurality of POS terminals 201. Some of the POS terminals 201 may be in self-checkout lanes in the checkout area. Some of the POS terminals 201 may be manual checkout lanes that can be operated by the team members 254. The POS terminal 201 can include the scanning device 256, input devices (e.g., touch screens, keyboards, microphones, mice, payment-receiving devices), and output devices (e.g., display screens, speakers, printers). The POS terminal 201 can further include an encryption mechanism 206, which can be configured to encrypt and/or decrypt identifying information for the card component 250 and/or the secure insert component 252 that are combined, purchased, and activated using the system 200. The encryption mechanism 206 can store/maintain a public key 208 and/or a private key 210 that correspond to the card component 250, the secure insert component 252, or a combination thereof. The keys 208 and 210 can be used to secure identifying information for the card component 250 and/or the secure insert component 252 as such information is stored and/or transmitted between components of the system 200 via the network(s) 215.

The card identifier and access code system 216 can be any type of computing system (e.g., backend server system, edge device, cloud computing system) configured to securely generate, validate, and/or associate the identifying information for the card component 250 and/or the secure insert component 252 at a time that these components are being combined for purchase. For example, the system 216 can determine whether a scanned identifier for the secure insert component 102 is already associated with a scanned identifier for the card component 100 or another card component. The system 216 can determine whether the scanned identifier for the secure insert component 102 and/or the scanned identifier for the card component 100 associate either of the components 102 and 100 with a geographic region of retail environment that is different than a current retail environment where these components are being combined for purchase. Various other checks may also be performed by the system 216 to verify the secure insert component 102 and the card component 100 before their purchase is completed.

The optional fraud detection system 244 can be configured to perform one or more techniques to determine whether communication between the system 200 components is compromised. The system 244 can identify patterns of gift card compromises at the retail environment to determine whether a particular POS terminal 201 in the retail environment is vulnerable (or most vulnerable) to being compromised. The system 244 may also be configured to check one or more identifiers for the card components 250 and/or the secure insert components 252 against identifiers that are recorded in one or more of the data stores 258, 260, and 262. If the system 244 determines that a particular card has likely been or is compromised (e.g., the card's identifier is associated with a purchased card and/or insert in the data store 262), the system 244 can generate one or more alerts (e.g., to be viewed and addressed by the team members 254 at the retail environment) and store the identifier associated with the particular card in the potentially compromised cards and/or inserts data store 260. The data store 260 can be populated with information indicating unique card numbers or other identifiers (such as pointers to the actual unique card number values) that have been compromised.

The card redemption system 214 can be any type of computing system configured to determine and/or identify when and if a gift card has been activated and/or a remaining balance is available on the gift card. For example, the system 214 can be used to access and load identifying information for the gift card (e.g., an access number and/or card number) to verify that such information has been associated with the gift card and/or a balance has been added to the gift card. A user of the gift card may also access or poll the system 214 (e.g., using their respective computing and/or mobile device) to check the remaining balance of the gift card and/or use the gift card to make one or more purchases. Sometimes, the system 214 may be configured to activate the gift card once the card is successfully purchased and paid for at the POS terminal 201. The system 214 may activate the gift card using identifying information for the card and/or the combination of the card component 250 and the secure insert component 252, which can be retrieved from the unpurchased cards and/or inserts data store 258 or the purchased cards and/or inserts data store 262, or otherwise received from the card identifier and access code system 216.

Still referring to the system 200 in FIG. 2, the team member 254 can combine the card component 250 from the card retention apparatus 202 with the secure insert component 252 from the insert retention apparatus 203 (block A, 220). As described throughout this disclosure, combining the components 250 and 252 can include inserting the secure insert component 252 into the card component 250 until the component 252 engages with a stopper/edge inside the component 250. The team member 254 can then pinch or press down on the combined components 250 and 252 and pull a tab of the secure insert component 252 out from the card component 250. Pulling on the tab causes an adhesive-resistant covering of the secure insert component 252 to be removed from inside the card component 250, thereby revealing identifying information for the card component 250 and/or the secure insert component 252.

The scanning device 256 at the POS terminal 201 can then be used to scan the assembled card component 250 in block B (222). For example, an identifier (e.g., unit ID barcode) on the card component 250 can be scanned and a visible identifier (e.g., unit ID barcode) on the secure insert component 252 can be scanned.

The POS terminal 201 can process card and/or secure insert information in block C (224). Processing the card information can include receiving payment from a guest to apply a balance to the card component 250. Processing the card information can include processing the payment and completing the purchase of the card component 250. Processing the card information can include, in some implementations, generating the public key 208 and the private key 210 for the particular assembled card using the encryption mechanism 206.

Optionally, the POS terminal 201 can output information instructing the team member 254 to check the assembly of the card component 250 with the secure insert component 252 (block D, 226).

Once the team member 254 provides input to the POS terminal 201 indicating a proper assembly, the POS terminal 201 can request unique identifying information for the component 250, such as a unique card number and/or access number, from the card identifier and access code system 216 (block E, 228). The encryption mechanism 206 of the POS terminal 201 can provide the public key 208 in the request to the system 216.

The system 216 can verify the card component 250 and the secure insert component 252 in block F (230). The system 216 can use the public key 208 to identify an association between the card component 250 and existing identifying information for the card component 250. This verification process can include comparing the scanned information with data stored in the potentially compromised cards and/or inserts data store 260 and the unpurchased cards and/or inserts data store 258. For example, the system 216 can determine whether a barcode that was scanned for the card component 250 appears as an entry in the unpurchased cards and/or inserts data store 258, which would indicate that the card component 250 has not previously been used and thus is available for activation and use. The system 216 can also determine whether the barcode that was scanned for the card component 250 appears as an entry in the potentially compromised cards and/or inserts data store 260, which would indicate that the card component 250 might have been compromised in the past and thus should be removed from the purchase. As yet another example, the system 216 can determine whether the barcode that was scanned for either the card component 250 or the secure insert component 252 appears as an entry in any of the data stores 258, 260, and 262 with a location identifier that does not correspond to a current location of the component 250 and/or 252 (in other words, the component 250 and/or 252 was linked to or otherwise meant for a different retail environment). The current location can be the retail environment where the components 250 and 252 are being combined and purchased. If the location identifier corresponds to a different retail environment, then the system 216 can determine that the component 250 and/or 252 is likely compromised and should not be used to complete the gift card purchase. The system 216 can store information indicating the compromise in the potentially compromised cards and/or inserts data store 260.

Once the system 216 verifies the card component 250 and/or the secure insert component 252 in block F (230), the system can associate the components 250 and 252 with each other in block G (232). For example, the system 216 can create a data entry in the purchased cards and/or inserts data store 262 that indicates an association between scanned information for the card component 250 and the secure insert component 252. One the association is made, the card component 250 and the secure insert component 252 combination may not be purchased by other guests in the retail environment or in other retail environments. For example, an identifier for the card component 250 (and/or a pointer to an actual card value) and an identifier for the secure insert component 252 (and/or a pointer to an actual insert value) can be paired and stored in the data store 262. The paired identifiers can be transmitted to the card redemption system 214 and used to redeem the card component 250, as described below.

The system 216 can encrypt association and/or verification information using the public key 208 (block H, 234) so that the system 216 can securely transmit the encrypted information back to the POS terminal 201 in block I (236).

The encryption mechanism 206 of the POS terminal 201 can be configured to decrypt the information using the private key 210 (block J, 238).

Once decrypted, the POS terminal 201 can complete purchase of the card component 250 with the secure insert component 252 in block K (240). The POS terminal 201 may also activate the card component 250 based on the decrypted information.

A guest, the team member 254, or any other relevant user (such as a person who receives the gift card as a gift from the guest) can access the card redemption system 214 to activate, redeem the balance, and/or check the balance of the card component 250 (block L, 242). The system 214 can access information from the purchased cards and/or inserts data store 262 and/or the card identifier and access code system 216 (refer to block G, 232) in order to redeem and/or check the balance of the card component 250 in block L (242).

At activation, the card number may already exist in the data store 258 and thus may be unused and not otherwise marked as unusable. An identifier or other unique information for the secure insert component may also exist in the data store 258 and thus may be unused and not otherwise marked as unusable. Furthermore, at activation, such card number and identifier can be checked to ensure that either/both of the card component and the secure insert component are available and set for use in the particular retail environment attempting to combine the components for activation of a gift card.

At redemption, the card number and its valid access code can be presented. If a barcode for the card number is scanned at the POS terminal, the card number, which may only be a portion of information stored in the barcode, can be extracted for use by the POS terminal. Encoding of information in both the card barcode and the secure insert identifier can be used such that the POS terminal can recognize that the card component and the secure insert component are these said components. As an illustrative example, each component can have a barcode of 26 digits, beginning in '04', and the next 2 digits can be '99' to indicate a gift card needing an access code and '98' to indicate the secure insert component being scanned. In this case, the POS terminal can check that a '99' and a '98' are scanned together in order to make a valid gift card. If a '98' is scanned when trying to redeem (or activate) the gift card instead of the card number, the POS can be prompted to read/process the barcode of the gift card instead. Although at time of redemption the POS terminal may know what the card number is if only the security insert component identifier is scanned (since the POS terminal can look up the associated card number in one or more data stores), the POS terminal may also prompt a relevant user to enter the card number value to ensure this is not a bad actor with information from only one part of this two-part gift card. Similarly, the POS terminal may produce an alert and not accept the secure insert component identifier in place of the access code even though both the identifier and the access code live together on the secure insert, but only the access code which had been covered by scratch off material.

In some implementations, the fraud detection system 244 can be configured to optionally perform one or more fraud detection check(s) to determine whether the card component 250 and/or the combination of the card component 250 and the secure insert component 252 have been compromised (block X, 246). Block X (246) can be performed before, during, or after any of the blocks described in FIG. 2. For example, block X (246) can be performed before, during, or after transmission of encrypted information between system components.

As described in relation to the card identifier and access code system 216, the fraud detection system 244 can access one or more of the data stores 258, 260, and 262 to determine whether the card component 250 and/or the secure insert component 252 has been scanned at other retail environments and/or is intended to be scanned at the other retail environments. If the component 250 and/or 252 has been or is intended to be scanned at the other retail environments, then the system 244 can mark the respective component as compromised.

Marking the respective component as compromised can include transmitting an alert to computing devices of relevant users, such as the team member 254 and/or the guest purchasing the card component 250. The alert can instruct the relevant user(s) to get a new card component 250 and/or secure insert component 252 to complete the purchase. Marking the respective component as compromised can include updating data entries associated with the compromised component(s) in one or more of the data stores 258, 260, and 262 to reflect that the respective component has been compromised and should not be used in gift card purchases.

Figure 3A:
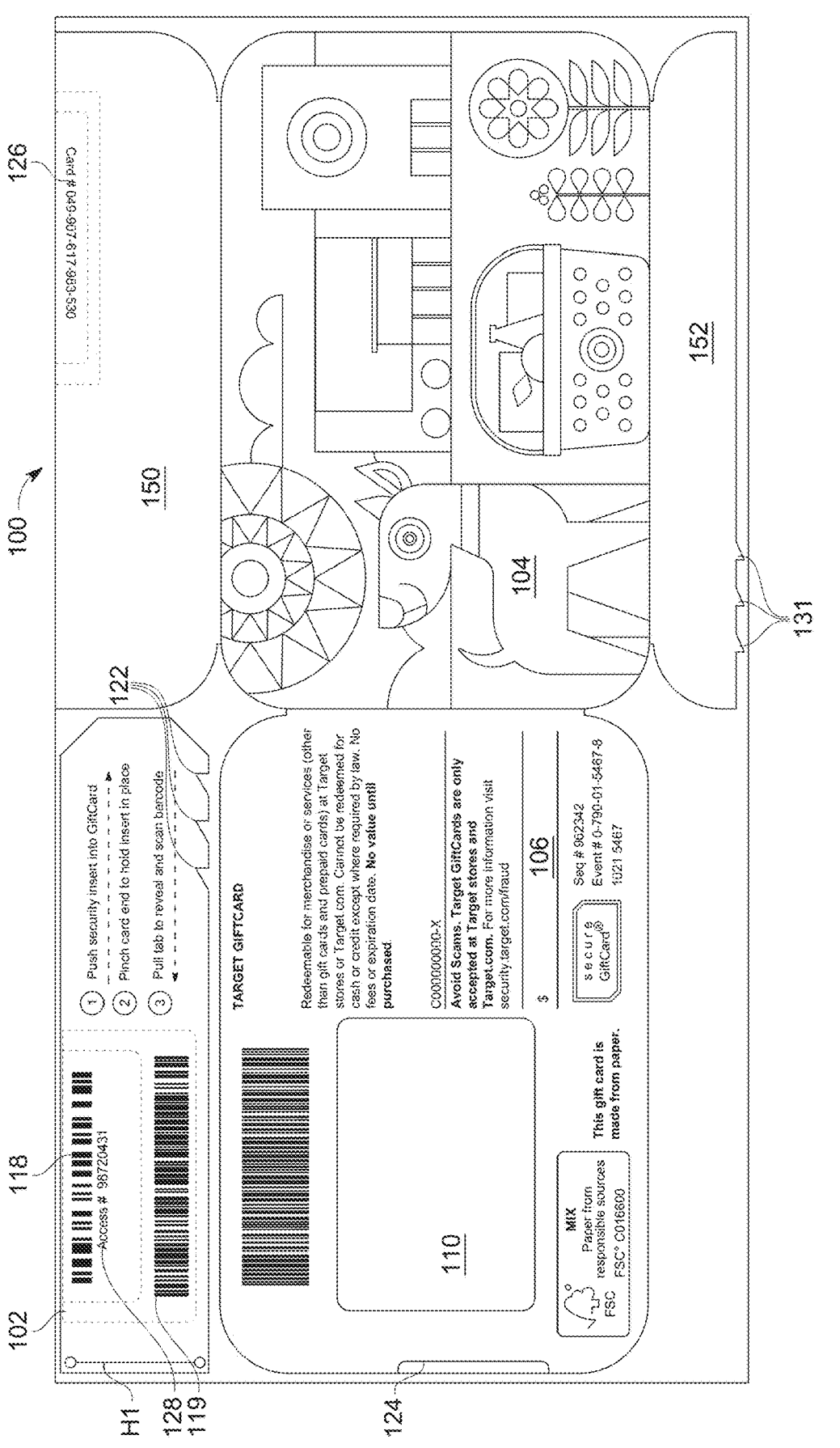
FIG. 3A illustrates a card component and a secure insert component, which can be combined to form a gift card.

FIG. 3A illustrates the card component 100 and the secure insert component 102, which can be combined to form a gift card. Refer to FIG. 1B for further discussion about the identifiers 118 and 119, the access number 128, the height H1, and the teeth 122 of the secure insert component 102. Also refer to FIG. 1B for further discussion about the front surface 104, the back surface 106, the flap 150 having the card number 126, the flap 152 having the teeth 131, the window 110, and the opening 124 of the card component 100.

Figure 3B:
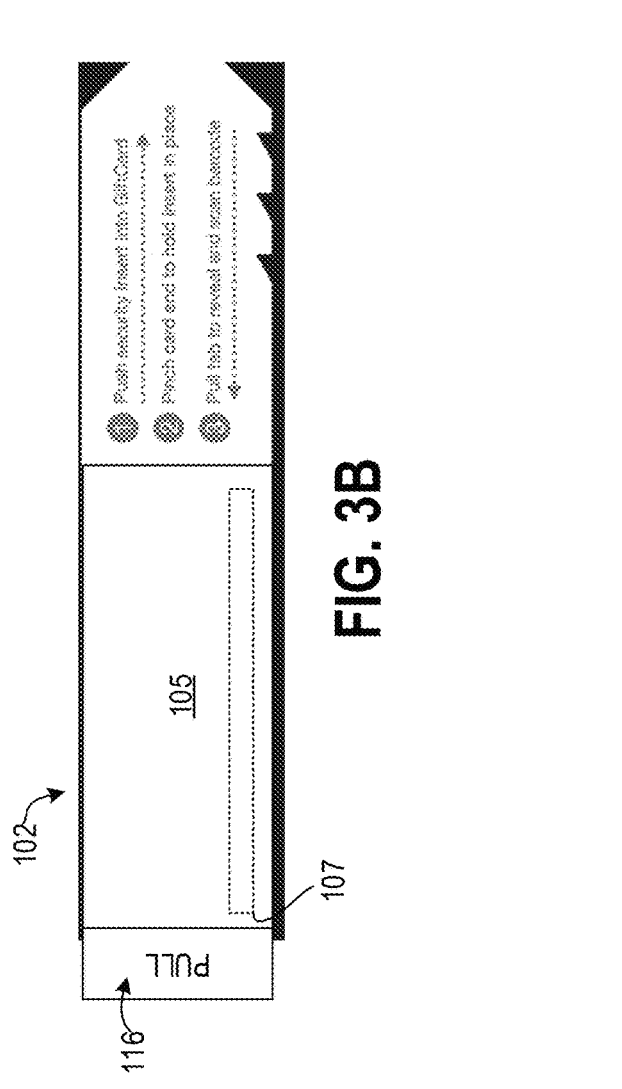
FIGS. 3B and 3C illustrate a secure insert component.
Figure 3C:
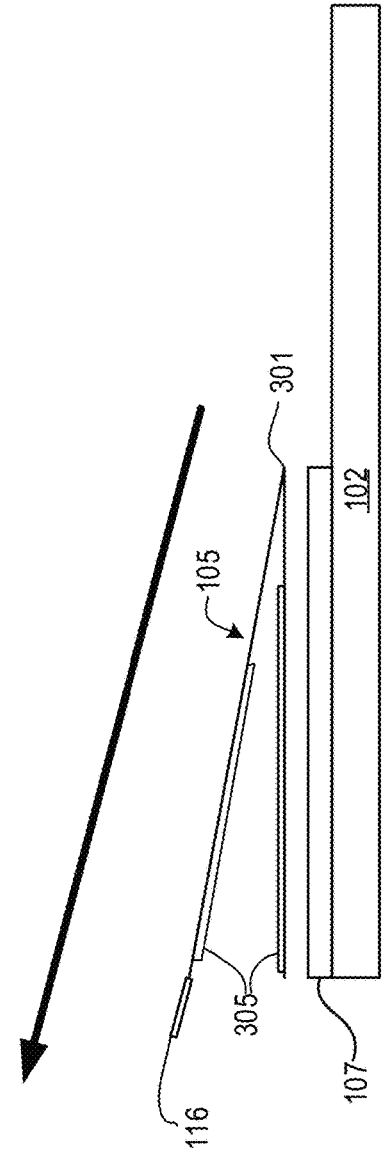

FIGS. 3B and 3C illustrate the secure insert component 102. Referring to both FIGS. 3B and 3C, the secure insert component 102 can include the adhesive-resistant covering 105, which can be configured to be removed from the secure insert component 102 when a user pulls on the tab 116 after inserting the component 102 into a card component. The secure insert component 102 can include the adhesive 107.

The adhesive-resistant covering 105 can be a layer that is more than a double a length of the portion of the secure insert component 102 that it is intended to cover. The adhesive-resistant covering 105 can accordingly fold down over the portion of the component 102 (e.g., at crease 301). When the user pulls on the tab 116, the adhesive-resistant covering 105 can unfold out of the card component 100, thereby exposing or otherwise revealing identifying information described herein that can be printed onto the portion of the secure insert component 102.

Still referring to both FIGS. 3B and 3C, in some implementations, the adhesive-resistant covering 105 can have non-stick properties on one side (for example, in scenarios where the covering 105 can be made of 2 materials-one material being adhesive-resistant on a surface that faces the adhesive 107 on the secure insert component 102. This side can cover the clear adhesive 107. Identifying information can be printed onto both the clear adhesive 107 and the secure insert component 102. The non-stick properties can have enough adhesion to the clear adhesive 107 used to keep the tab 116 and the adhesive-resistant covering 105 connected to a base material until the secure insert component

102 is inserted into a card component, but not so much adhesion that it becomes difficult to remove or pull on the tab 116 and the covering 105 once the secure insert component 102 is in the card component. The non-stick properties of the tab 116 and the covering 105 may cover an entirety of one side of the tab 116 and the covering 105, or may just be on a section of the secure insert component 102 that comes in contact with the tab 116 and/or the covering 105 on the base material of the secure insert component 102.

The adhesive-resistant covering 105 can be folded at a leading edge 301 of insertion. The adhesive-resistant covering 105 can be configured to retain a clean, sharp fold so that it remains flat to the base material of the secure insert component 102 when folded, thereby making insertion into the card component unimpaired. A material of the adhesive-resistant covering 105 can have sufficient strength such that the sharp fold of the material for this purpose may not create undue weakness in the material that would cause the material of the adhesive-resistant covering 105 to break or tear at the edge 301 when force is applied to pull the adhesive-resistant covering 105 by the tab 116 out of the card component and thus removed from the secure insert component 102.

Moreover, the leading edge 301 can sometimes be attached, at the leading folded section, to the base material of the secure insert component 102. Such attachment can be configured to ensure that the secure insert component 102 makes it into an opening defined by the card component without the fold of the adhesive-resistant covering 105 becoming an obstacle. This attachment can be weak enough in a direction when pulling the tab 116 so that this attachment can break easily, thereby making removal of the adhesive-resistant covering 105 from the secure insert component 102 relatively easy to the user.

In some implementations, an adhesive layer 305 can be applied to either portion of the adhesive-resistant covering 105 that folds in on itself at the leading edge 301, thereby causing the folded covering 105 to remain flat on the secure insert component 150. The adhesive layer 305 can be purposely weak to allow for the covering 105 to unfold when removed from the secure insert component 102 by pulling on the tab 116. The adhesive layer 305 may be applied at one or more points between top and bottom portions or ends of the folded covering 105. The adhesive layer 305 can be applied along an entirety of contact between sections of the adhesive-resistant covering 105 that are generated folding the covering 105 over itself at the leading edge 301. An adhesive force of the adhesive layer 305, such as a soft sticky wax, may only be strong enough to hold the folded material of the covering 105 flat prior to use, but may not be so strong as to cause undue force or difficulty in a user pulling the adhesive-resistant covering 105 via the tab 116 in a rolling manner from the secure insert component 102. Material used for the tab 116 can have strength sufficient that it may not shear or delaminate, or otherwise lose structural integrity, due to the adhesive force being worked against when the adhesive-resistant covering 105 is pulled from the secure insert component 102.

Sometimes, multiple pieces of material can be used for the adhesive-resistant covering 105, including but not limited to a non-stick section that can be configured to cover the adhesive 107 on the base material of the secure insert component 102 and another piece, such as of a different material, that can include a top portion of the covering 105 starting at the leading edge 301. If made of multiple parts, connectivity of those parts can be be strong enough to withstand forces applied to the covering 105 as a whole, without causing the parts to detach or otherwise come apart.

Figure 3D:
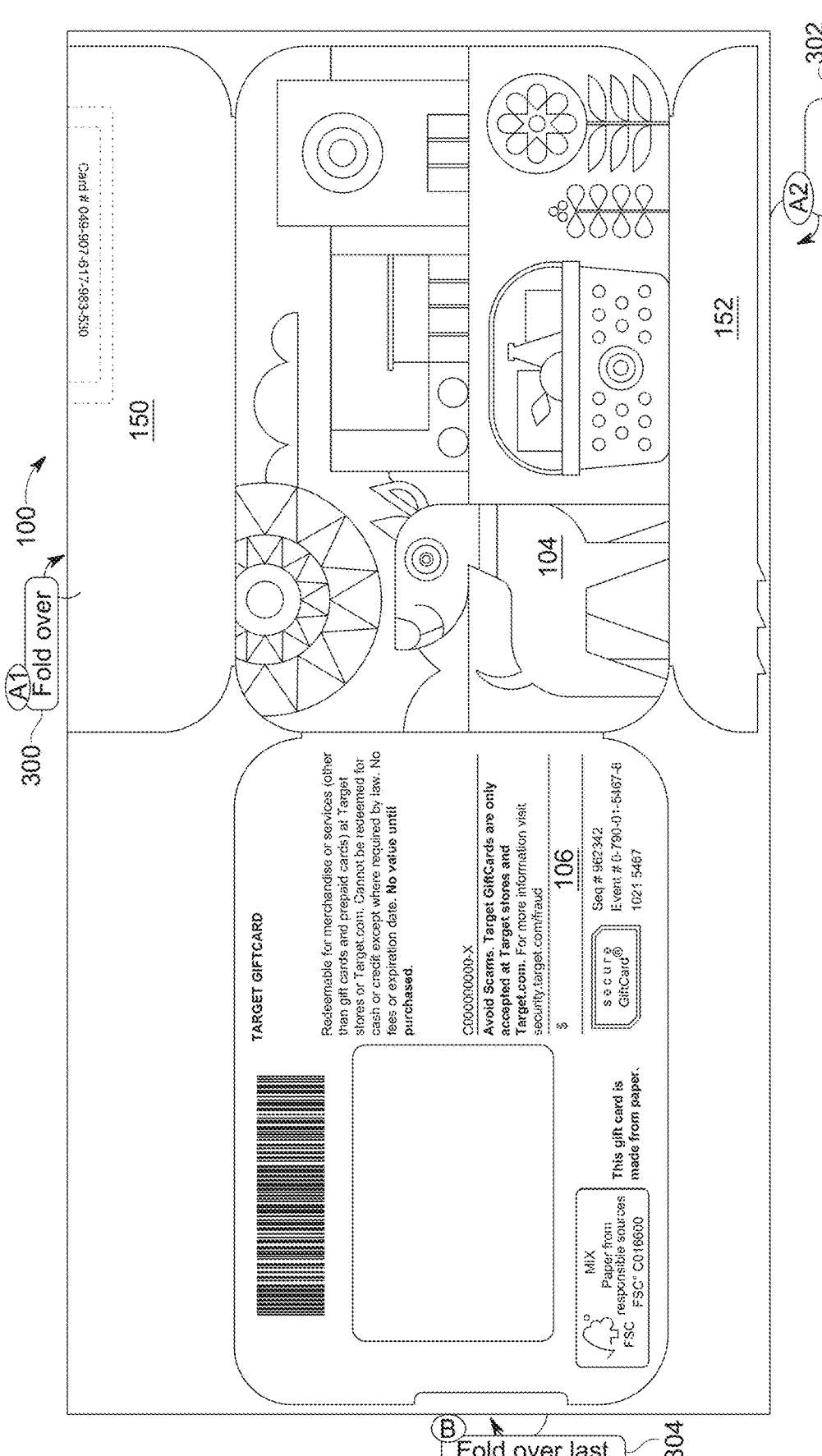
FIG. 3D is a conceptual diagram for assembling a card component.

FIG. 3D is a conceptual diagram for assembling the card component 100. The card component 100 can be assembled by folding over the flaps 150 and 152 as well as the back surface 106 of the card component 100. Once the flaps 150 and 152 and the back surface 106 are folded over, the card component can create a channel or slot that is configurably sized to receive a secure insert component as described throughout this disclosure.

As shown in FIG. 3D, the flap 150 can be folded over (block A1, 300) and the flap 152 can be folded over (block A2, 302). The flaps 150 and 152 can be folded over at the same time. Either of the flaps 150 and 152 can be folded over first. The back surface 106 can be folded over last (block B, 304). Folding over the back surface 106 can cause the folded-over flaps 150 and 152 to create a middle layer between the front surface 104 and the back surface 106 of the card component 100. This middle layer thereby can create a channel or slot that can be sized and configured to receive the secure insert component described herein.

Figure 3E:
FIG. 3E is a conceptual diagram of adhesives on inside surfaces of the card component of FIG. 3D.

FIG. 3E is a conceptual diagram of adhesives 318A-N on inside surfaces of the card component 100 of FIG. 3D. The front surface 104 of the card component 100 can have an opposite, inside surface 312. The back surface 106 of the card component 100 has an opposite, inside surface 316. The flap 150 of the card component 100 has an opposite inside surface 310. The flap 152 of the card component 100 has an opposite inside surface 314. Any one or more of the inside surfaces 312, 316, 310, and 314 may include one or more adhesives 318A-N. The adhesives 318A-N can be arranged as shown in FIG. 3E. One or more other adhesive arrangements are also possible.

To assemble the card component 100 as described in FIG. 3D, the flap 150 can be folded over such that the inner surface 310 of the flap 150 adheres to a portion of the inner surface 312 of the front surface 104 of the card component 102. The inner surface 310 can adhere to the inner surface 312 by one or more of the adhesives 318A-N illustrated in FIG. 3D. The flap 152 can be folded over such that the inner surface 314 of the flap 152 adheres to another portion of the inner surface 312 of the front surface 104 of the card component 102, using one or more of the example adhesives 318A-N. The inner surface 316 of the back surface 106 of the card component 100 can adhere to at least a portion of the flap 150, the flap 152, and/or the inner surface 312 of the front surface 104 of the card component 100 using one or more of the example adhesives 318A-N.

Figure 3G:
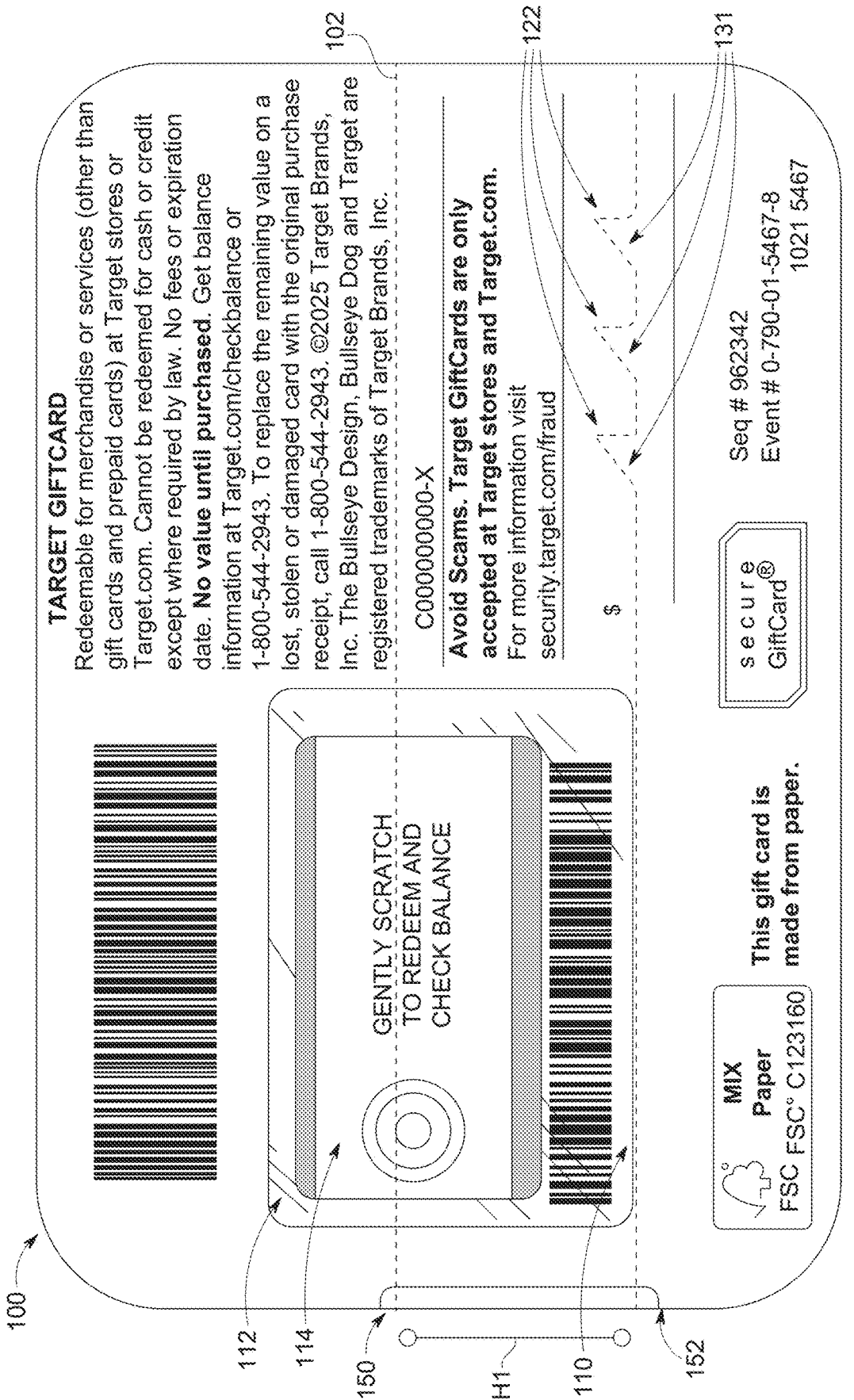
FIG. 3G is a conceptual diagram of the assembled card component of FIG. 3F once a secure insert component is inserted thereto.

FIG. 3F is a conceptual diagram of the assembled card component 100 of FIG. 3D. FIG. 3G is a conceptual diagram of the assembled card component 100 of FIG. 3F once the secure insert component 102 is inserted thereto. Referring to both FIGS. 3F and 3G, when the card component 100 is properly assembled, the card number 126 printed on the flap 150 can be visible through the window 110 on the back surface 106 of the card component 100. When the card component 100 is properly assembled, the teeth 131 of the flap 152, although not visible, are aligned inside the card component 100, as shown by the dotted lines. Edges of the flaps 150 and 152 can be aligned with opposing ends of the opening 124 of the card component 100 to create a channel 330, which can be sized to receive a secure insert component described herein. The channel 330 can have the height H1, which can be the same as or similar to the height of the secure insert component 102.

In the example of FIG. 3G, the secure insert component 102 has been properly inserted and aligned with the card component 100, as shown by mating of the teeth 122 of the secure insert component 102 and the teeth 131 of the flap 152. In addition, the scratch off material 114 has also been applied/affixed to the transparent material 112 overlaying the window 110 on the back surface 106 of the card component 100. Therefore, one or more identifying information on the secure insert component 102 may not be readily visible, and can be hidden beneath the material 114 (until the material 114 is scratched off/removed), as described herein.

In some implementations, as shown in FIG. 3F, the opening 124, which indicates an area of insertion for the secure insert component 102, can be represented in an indicia (e.g., color, shading, pattern) to make it easier for a relevant user to see and properly place and align the secure insert component 102 with the card component 100. In yet some implementations, guidance text 127 (e.g., "→place security insert into card") can also be printed on an inside surface of the card component 100 and visible through the window 110 underneath the transparent material 112. Once the secure insert component 102 is properly inserted into the card component 100, the guidance text 127 may no longer be visible.

Figure 4:
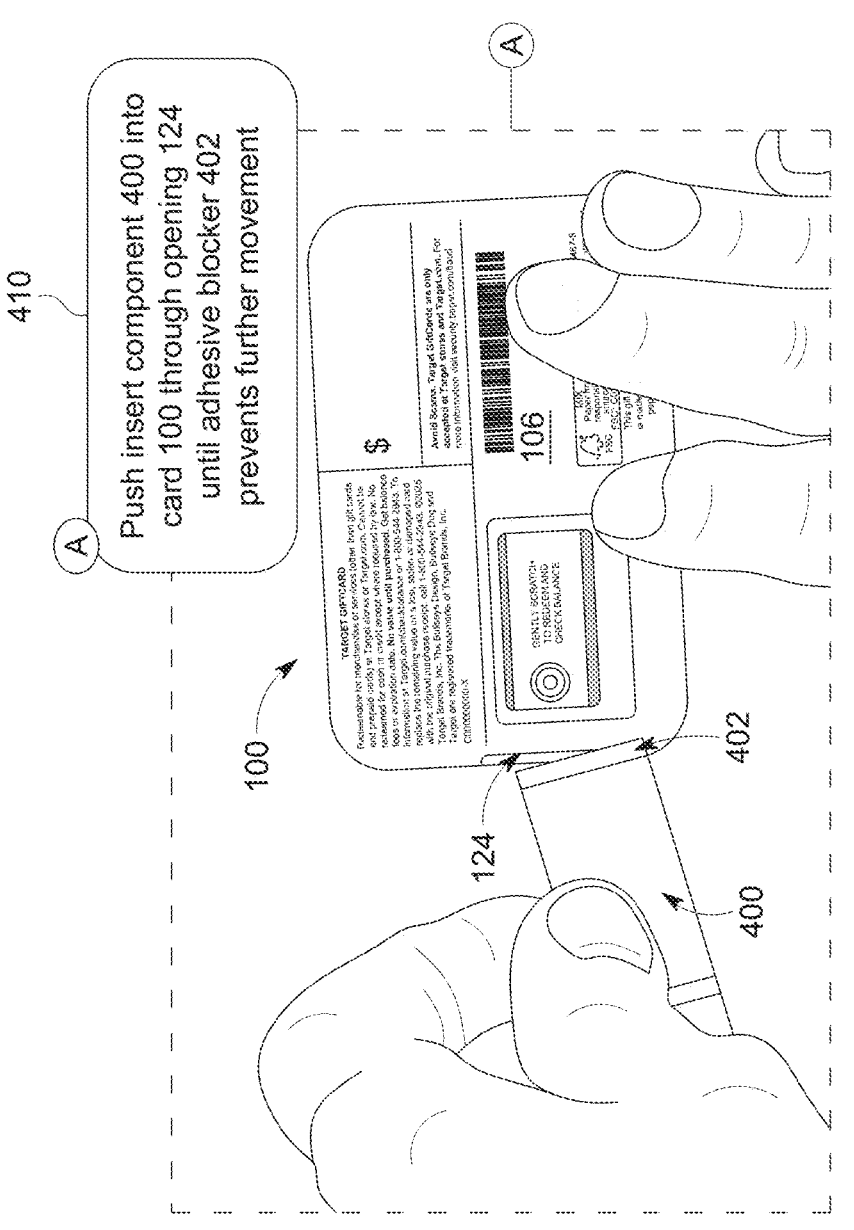
FIG. 4 is a conceptual diagram for combining a card component with a secure insert component.
Figure 4:
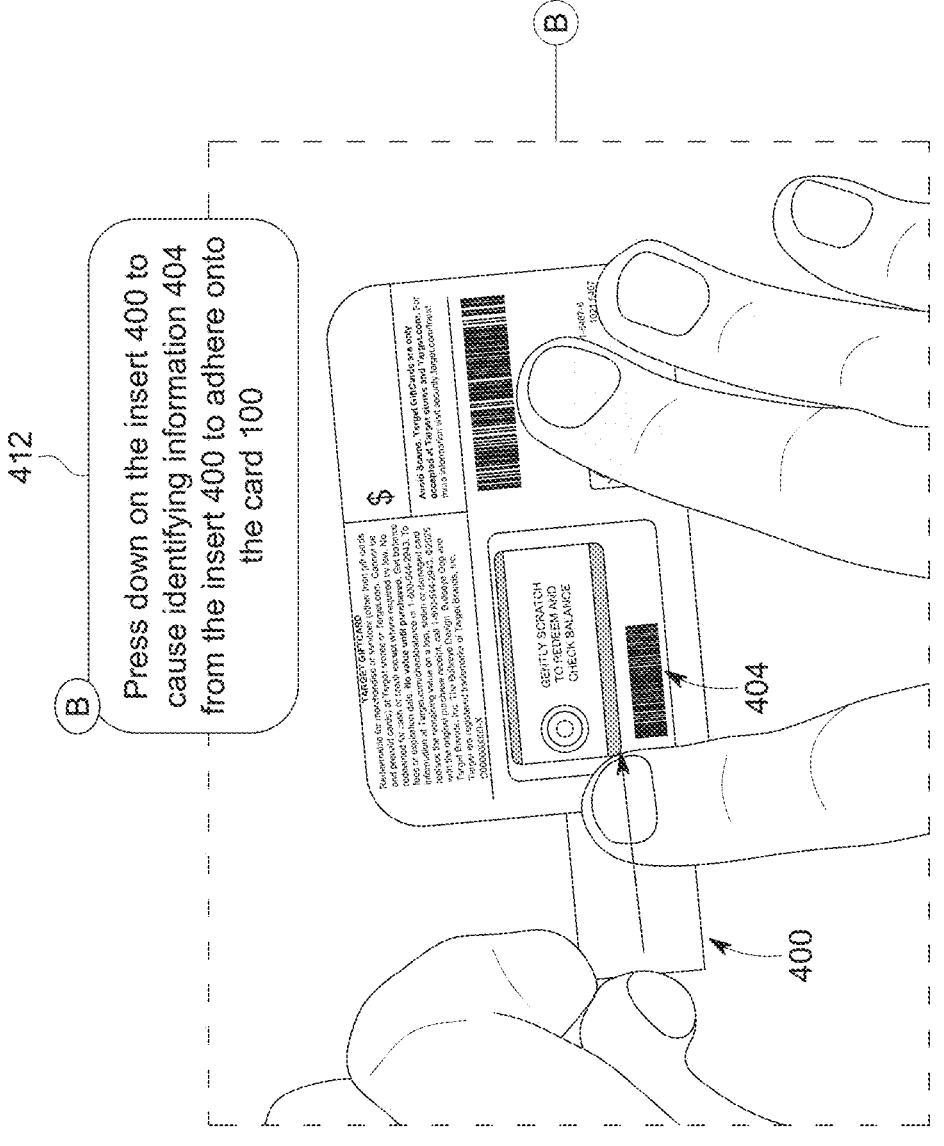
Figure 4:
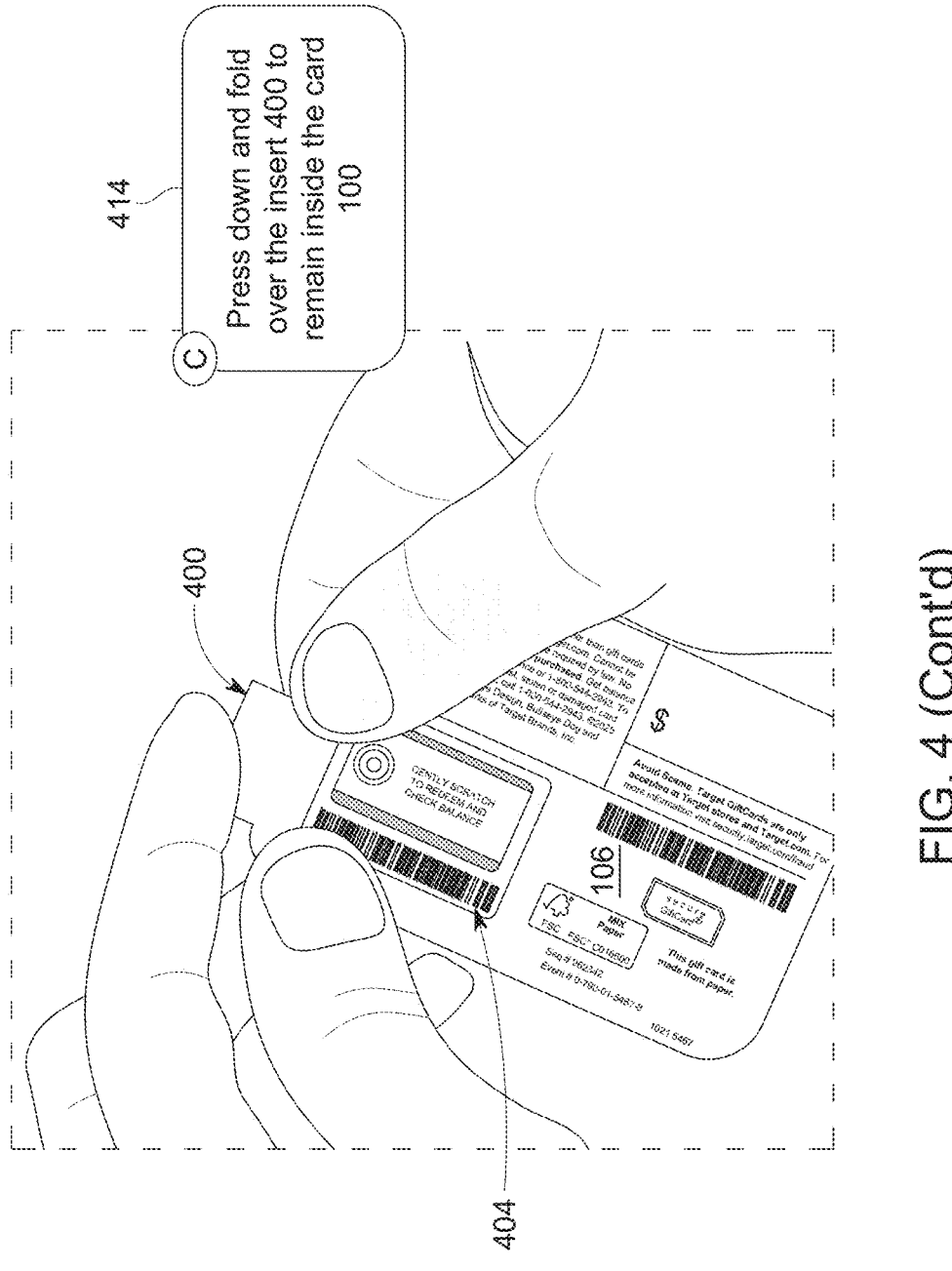

FIG. 4 is a conceptual diagram for combining the card component 100 with a secure insert component 400. Unlike the secure insert component 102 described herein, the insert component 400 can include identifying information 404 facing down, towards the back surface 106 of the card component 100 (instead of facing up as shown by the secure insert component 102). The insert component 400 can be inserted fully into the card component 100, and no portion of the insert component 400 may then be removed (in comparison to the secure insert component 102, in which the adhesive-resistant covering 105 is removed to reveal the upward-facing identifying information on the secure insert component 102).

Accordingly, a user can insert the insert component 400 into the card component 100 through the opening 124 until an adhesive blocker 402 on a leading edge of the insert component 400 prevents further movement (block A, 410). The adhesive blocker 402 can have enough grip so that the insert component 400 can be in fixed alignment inside the card component 100. The adhesive blocker 402 can have a front surface and a back surface opposite the front surface. The back surface can include printed information with adhesive applied over it. The adhesive blocker 402 can be on an adhesive-resistant material on the insert component 400 (e.g., the insert component 400 can be made of card stock paper, in some implementations). In some implementations, the insert component 400 may also include one or more teeth described throughout this document.

The user can press down on the insert component 400 to cause the identifying information 404 from the insert component 400 to adhere onto the card component 100 (block B, 412). As the user presses down on the card component 100 and pushes the insert component 400 therein, the identifying information 404 can be configured to roll onto the card component 100 and adhere thereto (rather than pulling the tab 116 of the secure insert component 102 to remove the adhesive-resistant covering 105 and thus reveal the identifying information on the secure insert component 102 described herein).

The user can also press down and fold over an edge of the insert component 400 that is opposite the leading edge to cause the insert component 400 to remain inside the card component 100 (block C, 414). As a result, no portion of the insert component 400 is removed from the card component 100.

Figure 5A:
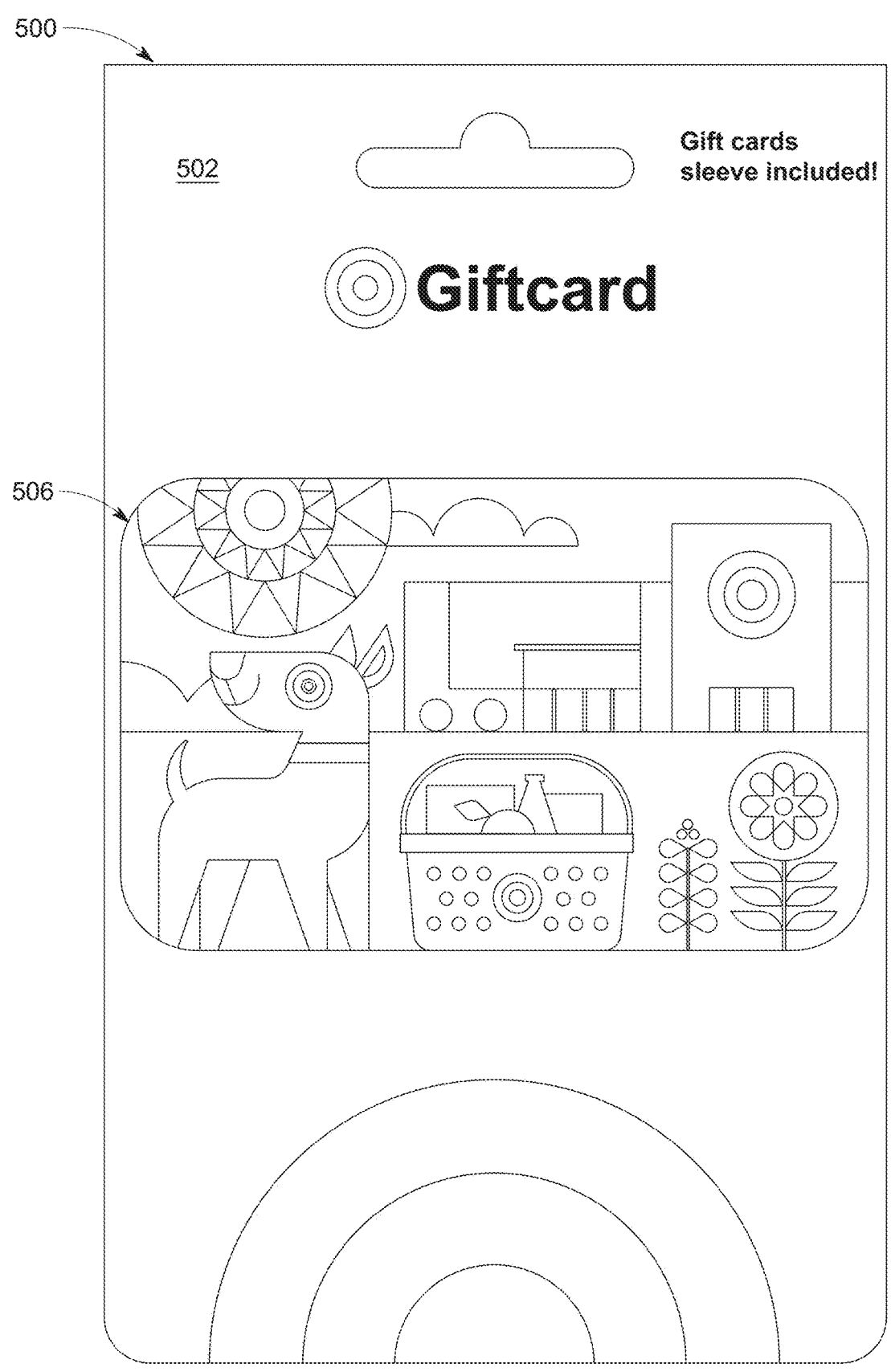
FIGS. 5A, 5B, and 5C illustrate example gift card carriers.
Figure 5B:
Figure 5C:

FIGS. 5A, 5B, and 5C illustrate example gift card carriers 500, 510, and 530, respectively. The gift card carriers 500, 510, and 530 can be used with any type of card component described herein. The gift card carriers 500, 510, and 530 may also be used with different types of card components.

In FIG. 5A, the gift card carrier 500 can include a front surface 502 and a back surface 504. The front surface 502 can include graphics 506 (e.g., artwork) that can mirror or otherwise correspond to artwork printed onto a card component (such as the card component 100) that is retained in the gift card carrier 500.

The back surface 504 of the gift card carrier 500 can include a window 508 through which information on the back surface 106 of a card component, such as the card component 100 described herein, can be visible. Here, the window 508 can provide visibility to a portion of the back surface 106 of the card component that includes the scratch off material 114 and one or more identifiers. The back surface 504 further may include a notch cutout 509, which can be sized to receive a secure insert component. Thus, the card component can already be attached to the carrier 500 at time of purchase/checkout. A team member or other relevant user can then assemble the card component with the secure insert component as described herein by inserting the secure insert component into an opening of the card component, accessible via the notch cutout 509 of the carrier 500.

In FIG. 5B, the gift card carrier 510 includes a front surface 512 and a back surface 514. The front surface 512 can include graphs 516, similar to the graphics 506 described in FIG. 5A. The back surface 514 can include windows 518 and 520, through which identifying information on a card component 522 may be viewed. The card component 522 can be the same as or similar to any of the other card components described herein. The card component 522 can include identifiers 524 and 528. The card component 522 can also include a scratch off material 526, which can cover one or more additional unique identifiers (e.g., card number, access number) that may be printed onto the card component 522 and/or attached to the card component 522 via a label (not depicted). Sometimes, the scratch off material 526 and the identifier 528 may be affixed to a label that is then attached to the card component 522.

The window 518 can permit for viewing and scanning the identifier 524, which can be a barcode corresponding to the card component 522 (and/or a UPC corresponding to artwork/graphics on the card component 522, thereby identifying the card component 522 and all similar card components by the artwork). The window 520 can permit for viewing and scanning the identifier 528, which can be paired and associated with the scanned identifier 524 in order to verify, purchase, and/or activate the card component 522.

In FIG. 5C, the gift card carrier 530 includes a front surface 532 and a back surface 534. The front surface 532 can include graphs 536, similar to the graphics 506 described in FIG. 5A. The back surface 534 can include a window 538, through which identifying information on the card component 522 may be viewed. The window 538 can permit for viewing and scanning the identifier 528.

The back surface 534 of the gift card carrier 530 can also include perforations 542, which can allow for a top portion of the back surface 534 to be folded over and back, thereby revealing the identifier 524 of the card component 522. The identifier 524 can then be scanned, paired, and associated with the scanned identifier 528 in order to verify, purchase, and/or activate the card component 522.

FIGS. 6A and 6B is a flowchart of a process 600 for assembling a card component with a secure insert component and purchasing the combined components as a gift card. The process 600 can be performed to ensure that identifying information for a gift card is not exposed until the card is purchased and paid for during the checkout process. One or more blocks in the process 600 can be performed by one or more system components described herein, such as the POS terminal 201, the card identifier and access code system 216, the card redemption system 214, the fraud detection system 244, and/or the user mobile devices. One or more blocks in the process 600 may be performed by relevant users, such as a team member in a retail environment. The process 600 can also be performed by one or more other computing systems, devices, computers, networks, cloud-based systems, and/or cloud-based services.

Referring to the process 600 in FIGS. 6A and 6B, a card component can be received from a card retention apparatus in block 602. Refer to FIGS. 1A and 2 for further discussion.

In block 604, at least one identifier on the card component can be scanned. The identifier(s) can include but is not limited to a barcode, QR code, SKU, etc. The identifier(s) can be scanned using one or more scanning devices at a POS terminal in the checkout area (e.g., handheld scanning devices, barcode readers, imaging devices, user computing devices). Refer to FIG. 2 for further discussion.

A team member can be notified of a gift card purchase based on the scan in block 606. The notification can be received at a mobile device or other computing device of the team member, such as if the gift card purchase is being performed at a self-checkout lane. Sometimes, instead of transmitting a notification to the team member, a light at the self-checkout lane can become illuminated and/or flash to attract the team member's attention. In a manual, belted checkout lane scenario with a cashier, the POS terminal can prompt the cashier (e.g., the team member) to combine the scanned card component with a secure insert component, as described below. The notification can instruct the team member to approach a guest that scanned the identifier(s) in block 604 (in a self-checkout scenario). Refer to FIG. 2 for further discussion.

Then, a secure insert component can be received from an insert retention apparatus (block 608). The team member can retrieve the secure insert component from the insert retention apparatus, which may only be accessible by the team member. In some implementations, the retention apparatus can be a box. The retention apparatus may additionally or alternatively be a dispenser. Refer to at least FIG. 2 for further discussion.

The secure insert component can be pushed into an opening of the card component until teeth along an edge of the secure insert component are in fixed alignment relative the card component (block 610). Refer to at least FIGS. 1A and 1C for further discussion.

In block 612, pressure can be applied to the card component having the secure insert component positioned therein. For example, a guest or the team member can pinch on a surface near an edge of the card component where a leading edge of the secure insert component has been fully inserted, thereby holding the secure insert component in place. By pinching down on the combination of the card component with the secure insert component therein, the guest and/or team member can then pull out a portion of the secure insert component to reveal identifying information, as described below in reference to block 614. Refer to at least FIGS. 1A and 1C for further discussion.

Accordingly, a tab of the secure insert can then be pulled to remove an opaque covering (adhesive-resistant covering 105 described herein), thereby revealing identifying information in a fixed location and adhered to the card component (block 614). The identifying information can be aligned with a scratch off material that has previously been applied to the card component. Peeling back the opaque covering using the tab can leave the card identifying information on a surface of the card component.

The identifying information can adhere to the surface of the card component via adhesives. The identifying information can be adhered to the card surface beneath a transparent material covering a portion of the card component, as described herein. In some implementations, the card identifying information can adhere to a back surface of the transparent material. The card identifying information may not have enough rigidity to remain attached to the opaque covering when the tab is pulled in block 614. In some implementations adhesive can be applied on top of the card identifying information and beneath the opaque covering so that when the opaque covering is pulled off, the adhesive adheres the secure insert component having the card identifying information to the back surface of the transparent material. Refer to at least FIGS. 1A, 1B, IC, 3A, 3B, 3C, 3D, 3E, 3F, and 3G for further discussion.

The identifying information can be scanned in block 616. For example, an identifier, such as a barcode, that has been revealed on the card component as a result of performing block 614 can be viewed and scanned. Refer to at least FIG. 2 for further discussion.

In block 618, validation can be requested for the card component and based on the scan(s). A computer system (e.g., the POS terminal) can request validation and/or authorization information for the card and secure insert components based on the scanned identifier(s). The request can be made to a computer system that checks whether the card and/or the insert have been associated with other cards and/or inserts in a data store/data repository for the retail environment. The computer system can be the card identifier and access code system 216 described in FIG. 2. As described in FIG. 2, the system 216 can compare the scanned identifier(s) for the card and/or the insert to data entries stored in the data store. The comparison can be performed to check whether the scanned card and/or insert have already been associated with another guest, purchase, and/or funds. The comparison can also be performed to check whether the scanned card and/or insert have already been identified as potentially compromised (and thus unusable for the current guest's purchase). As described in FIG. 2, the computer system can also encrypt the request, then transmit the request to the system 216. The request can include, for example, an encryption key used for encrypting and/or decrypting information associated with the scanned card and/or insert.

Accordingly, encrypted information for the card component can then be received in response to the request for validation and the scan(s) (block 620). The encrypted information can be received from the card identifier and access code system 216 described further in FIG. 2. The system 216 can be configured to use the encryption key to access information (e.g., stored in the data store) that has been associated with the card, such as an access number and/or card number. This access number and/or card number may be used to provide access to funds that have been added to the card during the checkout process. The encryption key can also be used by the system 216 to encrypt the accessed information for the card before transmitting such information to the computer system (e.g., the POS terminal).

The received encrypted information can be decrypted in block 622. The computer system (e.g., POS terminal) can decrypt the information using a private key or other encryption key that is known to the computer system and securely stored there. Refer to FIG. 2 for further discussion.

It can be determined whether the at least one identifier and the identifying information are associated with a geographic location that satisfies one or more location criteria in block 624. When card and secure insert components are initially deployed to retail environments, they can be associated, in a data store, with geographic locations that correspond to the retail environments. When the components are scanned during the checkout process, the computer system (e.g., the POS terminal) can check whether the geographic location of scanning matches the geographic locations that the components were initially associated with. If the geographic location matches at time of checkout with the initial geographic location, then the one or more location criteria is satisfied and the computer system can determine that the components have not been improperly relocated from their initial geographic locations. In other words, the components likely have not been compromised by a potentially malicious actor. On the other hand, if the computer system determines that the geographic location at time of checkout does not match the initial geographic location, then the computer system can determine that the components have likely been compromised.

Accordingly, if the one or more location criteria is not satisfied (e.g., the component(s) is likely compromised), block 630 can be performed, as discussed further below.

If the one or more location criteria is satisfied (e.g., the component(s) is likely not compromised), then block 626 can be performed. In block 626, it can be determined whether (i) an association already exists between the at least one identifier and other identifying information or (ii) an association already exists between the identifying information and another identifier, based on the decrypted information. In other words, the computer system (e.g., POS terminal) may access one or more data stores described herein and check whether either the identifier for the card component or the identifying information for the secure insert component have already been recorded and/or associated with other components in the retail environment or across a network of retail environments. If the card component has been recorded/associated with another component, then the card component cannot be used in the current checkout process. If the secure insert component has been recorded/associated with another component, then the secure insert component cannot be used in the current checkout process.

Therefore, if an association already exists as described in block 626, then block 630 can be performed, in which a notification can be generated and returned to the POS terminal and/or a team member device indicating that the card component and/or the secure insert component needs to be replaced to complete purchase of the gift card. The notification can prompt the guest and/or the team member to return to the card retention apparatus and select a new card component. The notification can prompt the team member to discard the secure insert component and get a new secure insert component from the insert retention apparatus. The notification can prompt the guest to bring the card and insert components to a customer service location in the retail environment, where relevant team members may dispose of these components.

As another example, the notification can prompt the guest to throw out the card and/or the insert components. In some implementations, the notification can include automatically cancelling a transaction having the card and insert components. The notification can, in some implementations, also be generated to flag that the particular card and insert do not match and that the transaction is cancelled. The flagging information can be stored in the data store and used to keep track of which cards and/or inserts are compromised or unusable.

If an association does not already exist as described in block 626, then block 628 is performed, in which a notification can be generated and returned to the POS terminal and/or the team member device indicating to complete the purchase of the gift card. To complete the purchase of the gift card, payment for funds to be applied/added to the card can be received. For example, a guest purchasing the card can designate at the POS terminal how much money they would like to put onto the card. The guest can select the amount of money from a list of various dollar amounts (or other currencies), such as $10, $15, $20, $25, $50, $100, etc. The guest can manually input the amount of money desired using a key pad, touchscreen, or other type of input device at the POS terminal. The guest can also tell a team member at the POS terminal the amount of money to add to the card, and then the team member can apply the guest-designated amount to the card. The guest then may provide payment, such as a credit card, mobile wallet, cash, etc., at the POS terminal to apply the amount of money (e.g., funds) to the card.

Once the payment is received and processed, a computer system (e.g., the POS terminal) can verify the purchase of the gift card and proceed to apply the funds to the card. Sometimes, applying funds to the card can be performed before, during, or after any other blocks described in the process 600. For example, the funds can be applied to the card between blocks 604 and 606. In some implementations, once the purchase is completed, information can be stored in the data store indicating an association between the card and insert components and that the card has been activated.

Figure 7:
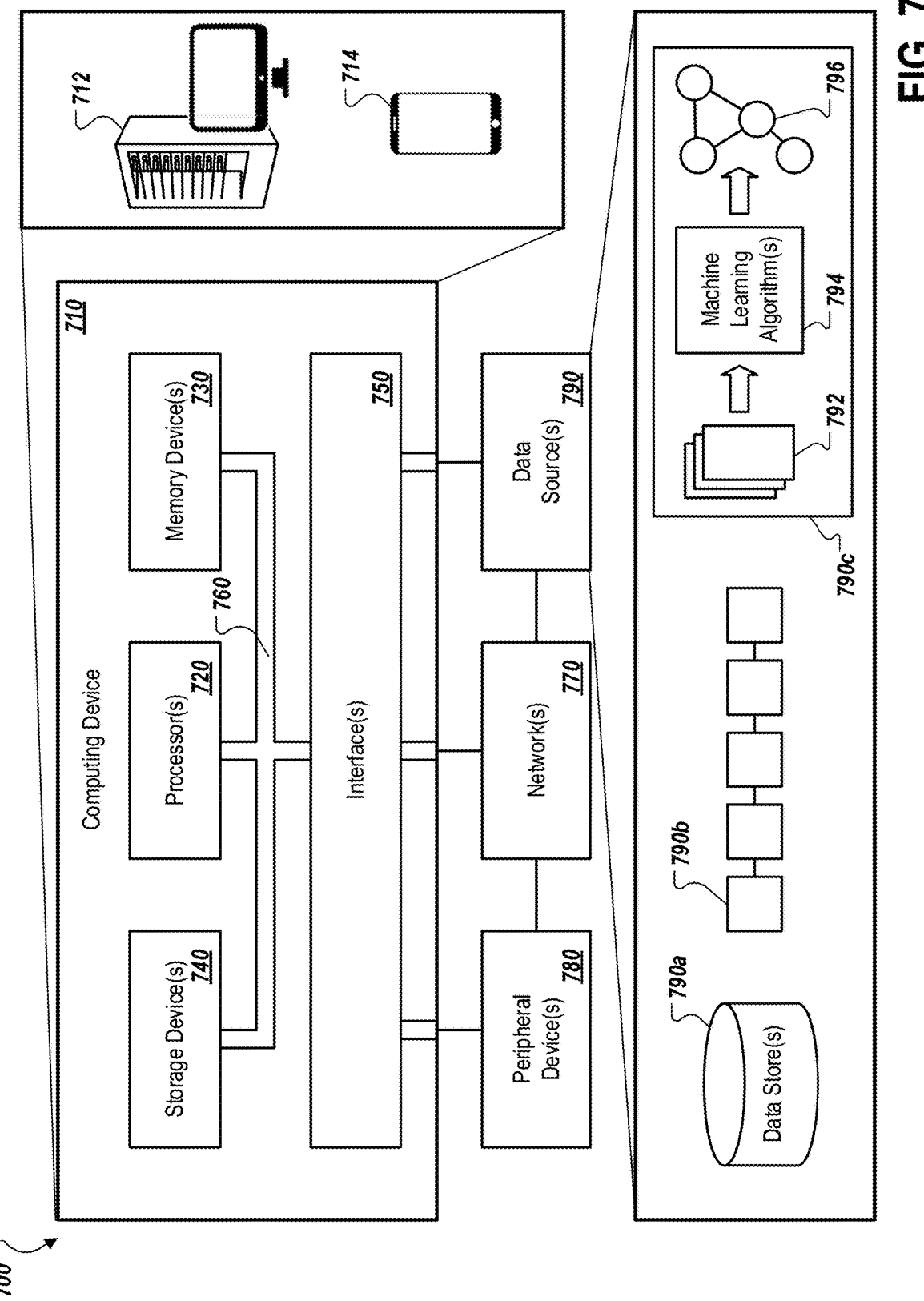
FIG. 7 is a schematic diagram that shows an example of a computing device and a mobile computing device.

FIG. 7 is a schematic diagram that shows an example of a computing system 700 that can be used to implement the techniques described herein. The computing system 700 includes one or more computing devices (e.g., computing device 710), which can be in wired and/or wireless communication with various peripheral device(s) 780, data source(s) 790, and/or other computing devices (e.g., over network(s) 770). The computing device 710 can represent various forms of stationary computers 712 (e.g., workstations, kiosks, servers, mainframes, edge computing devices, quantum computers, etc.) and mobile computers 714 (e.g., laptops, tablets, mobile phones, personal digital assistants, wearable devices, etc.). In some implementations, the computing device 710 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 710, and an entire system can be made up of multiple devices communicating with each other. For example, the computing device 710 can be part of a computing system that includes a network of computing devices, such as a cloud-based computing system, a computing system in an internal network, or a computing system in another sort of shared network. Processors of the computing device (710) and other computing devices of a computing system can be optimized for different types of operations, secure computing tasks, etc. The components shown herein, and their functions, are meant to be examples, and are not meant to limit implementations of the technology described and/or claimed in this document.

The computing device 710 includes processor(s) 720, memory device(s) 730, storage device(s) 740, and interface(s) 750. Each of the processor(s) 720, the memory device(s) 730, the storage device(s) 740, and the interface(s) 750 are interconnected using a system bus 760. The processor(s) 720 are capable of processing instructions for execution within the computing device 710, and can include one or more single-threaded and/or multi-threaded processors. The processor(s) 720 are capable of processing instructions stored in the memory device(s) 730 and/or on the storage device(s) 740. The memory device(s) 730 can store data within the computing device 710, and can include one or more computer-readable media, volatile memory units, and/or non-volatile memory units. The storage device(s) 740 can provide mass storage for the computing device 710, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 750 can include various communications interfaces (e.g., USB, Near-Field Communication (NFC), Bluetooth, WiFi, Ethernet, wireless Ethernet, etc.) that can be coupled to the network(s) 770, peripheral device(s) 780, and/or data source(s) 790 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 750 can include a control interface that receives commands from an input device (e.g., operated by a user) and converts the commands for submission to the processors 720. The interface(s) 750 can include a display interface that includes circuitry for driving a display to present visual information to a user. The interface(s) 750 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 770 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 710 can communicate with the peripheral device(s) 780, the data source(s) 790, and/or other computing devices over the network(s) 770. In some implementations, the computing device 710 can directly communicate with the peripheral device(s) 780, the data source(s), and/or other computing devices.

The peripheral device(s) 780 can provide input/output operations for the computing device 710. Input devices (e.g., keyboards, pointing devices, touchscreens, microphones, cameras, scanners, sensors, etc.) can provide input to the computing device 710 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 710 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 790 can provide data for use by the computing device 710, and/or can maintain data that has been generated by the computing device 710 and/or other devices (e.g., data collected from sensor devices, data aggregated from various different data repositories, etc.). In some implementations, one or more data sources can be hosted by the computing device 710 (e.g., using the storage device(s) 740). In some implementations, one or more data sources can be hosted by a different computing device. Data can be provided by the data source(s) 790 in response to a request for data from the computing device 710 and/or can be provided without such a request. For example, a pull technology can be used in which the provision of data is driven by device requests, and/or a push technology can be used in which the provision of data occurs as the data becomes available (e.g., real-time data streaming and/or notifications) . Various sorts of data sources can be used to implement the techniques described herein, alone or in combination.

In some implementations, a data source can include one or more data store(s) 790a. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database (s), for example, can include relational databases, object databases, structured document databases, unstructured document databases, graph databases, and other appropriate types of databases.

In some implementations, a data source can include one or more blockchains 790b. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 790c. The machine learning system(s) 790c, for example, can be used to analyze data from various sources (e.g., data provided by the computing device 710, data from the data store(s) 790a, data from the blockchain(s) 790b, and/or data from other data sources), to identify patterns in the data, and to draw inferences from the data patterns. In general, training data 792 can be provided to one or more machine learning algorithms 794, and the machine learning algorithm(s) can generate a machine learning model 796. Execution of the machine learning algorithm(s) can be performed by the computing device 710, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for assembling a secure gift card for purchase and use in a retail environment, the system comprising:
   a first gift card component of a first type, wherein the first gift card component includes a first identifier;
   a second gift card component of a second type that is different from the first type, wherein the second gift card component is separate from the first gift card component and includes a second identifier, wherein the second gift card component is configured to be permanently attached to the first gift card component to form a combined gift card that is purchasable during a checkout process;
   a point of sale (POS) terminal configured to process purchase and activation of the combined gift card; and
   a computer system in network communication with the POS terminal and configured to validate the combined gift card based on the checkout process being performed at the POS terminal to purchase and activate the combined gift card,
   wherein the POS terminal is configured to perform operations comprising:
      scanning, using a scanning device at the POS terminal, the first identifier and the second identifier;
      transmitting, to the computer system, a request to validate the combined gift card, wherein the request includes the scanned first identifier and the scanned second identifier;
      receiving, from the computer system, card validation information indicating that the combined gift card is approved for purchase during the checkout process, wherein the computer system is configured to generate the card validation information by (i) validating the scanned first identifier and the scanned second identifier against gift card associations in a data store, and (ii) generating a data entry in the data store that associates the unique identifiers for the first gift card component and the second gift card component of the combined gift card with each other;
      activating, based on the card validation information, the combined gift card; and
      completing, based on the activation and the card validation information, the checkout process.

2. The system of claim 1, wherein:
   the first gift card component is a card component having a front surface and a back surface,
   the back surface includes a window and a transparent material that is configured to extend over the window,
   the back surface further includes a scratch off material that is affixed to a portion of the transparent material, and
   the scratch off material is configured to hide one or more identifying information for the combined gift card until the scratch off material is removed from the transparent material.

3. The system of claim 2, wherein:
   the first gift card component further includes an opening through which the second gift card component is configured to be received,
   a middle layer between the front surface and the back surface of the first gift card component defines a channel for receiving the second gift card component, and
   the second identifier of the second gift card component is visible through the window of the back surface of the first card component.

4. The system of claim 3, wherein:

the second gift card component further comprises identifying information that is visible through the window of the back surface of the first card component, the back surface of the first gift card component further includes a scratch off material that is affixed to a portion of the transparent material and configured to hide the identifying information of the second gift card component from being visible through the window until the scratch off material is removed from the transparent material, and the identifying information comprises a third identifier and an access number.

5. The system of claim 1, wherein the second gift card component comprises a secure insert component, the secure insert component comprises:

a secure insert portion having at least the second identifier, one or more teeth at a leading edge of the secure insert component, wherein the one or more teeth are configured to mate with corresponding teeth of a middle layer of the first gift card component for fixed alignment of the secure insert component inside the first gift card component, an adhesive-resistant covering that is double a length of the secure insert portion and configured to fold over the secure insert portion to hide the second identifier from being visible before the secure insert component is inserted into the first gift card component, and a tab that is affixed to an end of the adhesive-resistant covering and configured to be pulled to cause the adhesive-resistant covering to unfold out from inside the first gift card component when the secure insert component is inside the first gift card component, wherein unfolding the adhesive-resistant covering out from inside the first gift card component is configured to reveal at least the second identifier through the window of the first gift card component.

6. The system of claim 5, wherein assembling the first gift card component with the secure insert component comprises:

pushing the secure insert component in a first direction through the opening defined by the first gift card component until the one or more teeth of the secure insert component mate with the corresponding teeth of the middle layer of the first gift card component;

pinching a portion of the first gift card component that includes the secure insert component in fixed alignment inside the first gift card component; and pulling on the tab in a second direction opposite the first direction to cause the adhesive-resistant covering to be removed from the secure insert portion of the secure insert component to reveal at least the second identifier through the window of the back surface of the first gift card component.

7. The system of claim 1, wherein validating the scanned first identifier and the scanned second identifier comprises determining that the first gift card component or the second gift card component is not associated with another combined gift card.

8. The system of claim 1, wherein the first identifier or the second identifier comprises a pointer that, when scanned, causes the POS terminal to (i) access the computer system and (ii) retrieve, based on the pointer, identifying information associated with the first identifier or the second identifier, respectively.

9. The system of claim 1, wherein the first gift card component is removably attached to a retention apparatus of a display at a retail environment and the second gift card component is dispensed from a retention apparatus in a checkout area of the retail environment.

10. The system of claim 1, wherein the data entry that associates the unique identifiers for the first gift card component and the second gift card component comprises a unique value that includes the first identifier and the second identifier.

\* \* \* \* \*